(12) United States Patent
Ajiro

(10) Patent No.: US 7,743,148 B2
(45) Date of Patent: Jun. 22, 2010

(54) SERVER MIGRATION PLANNING SYSTEM AND SERVER MIGRATION PLANNING METHOD

(75) Inventor: Yasuhiro Ajiro, Tokyo (JP)

(73) Assignee: NEC Corporation, Tokyo (JP)

( * ) Notice: Subject to any disclaimer, the term of this patent is extended or adjusted under 35 U.S.C. 154(b) by 326 days.

(21) Appl. No.: 12/022,397

(22) Filed: Jan. 30, 2008

(65) Prior Publication Data

US 2008/0209043 A1 Aug. 28, 2008

(30) Foreign Application Priority Data

Feb. 23, 2007 (JP) .............................. 2007-043787

(51) Int. Cl.
G06F 15/173 (2006.01)
(52) U.S. Cl. .................... 709/226; 709/212; 709/216; 707/10; 711/170; 711/162
(58) Field of Classification Search ................ 709/212, 709/216, 226; 707/10; 711/170, 162
See application file for complete search history.

(56) References Cited

U.S. PATENT DOCUMENTS

| | | | | |
|---|---|---|---|---|
| 6,996,563 B2* | 2/2006 | Kumagai et al. | ............... | 707/10 |
| 7,024,529 B2* | 4/2006 | Yamada et al. | ............... | 711/162 |
| 2007/0192560 A1* | 8/2007 | Furuhashi | ................... | 711/170 |

FOREIGN PATENT DOCUMENTS

| | | | |
|---|---|---|---|
| JP | 10-027167 A | 1/1998 | |
| JP | 10161987 A | 6/1998 | |
| JP | 11024949 A | 1/1999 | |
| JP | 2002108839 A | 4/2002 | |
| JP | 2003046539 A | 2/2003 | |
| JP | 2004280457 A | 10/2004 | |
| JP | 2005115653 A | 4/2005 | |
| JP | 2005174087 A | 6/2005 | |
| JP | 2006092053 A | 4/2006 | |
| JP | 2006113827 A | 4/2006 | |
| JP | 2007133586 A | 5/2007 | |

OTHER PUBLICATIONS

International Search Report for PCT/JP2008/064865 issued Nov. 4, 2008.
Korte, B., et al. "Combinatorial Optimization: Theory and Algorithms", Nov. 3, 2005, pp. 470-472, translated by Takao Asano et al., Springer-Verlag, Tokyo, Japan.

* cited by examiner

Primary Examiner—Tammy T Nguyen

(57) ABSTRACT

A server migration planning system for planning server migration from source servers to destination servers is provided. A processor allocates the respective source servers to any ones of the destination servers, based on the resource usage of the respective source servers and resource capacity of the respective destination servers. The processor selects the source servers one-by-one in descending order of the resource usage, selects any one of the destination servers, and makes a comparison between a comparison-object usage as the resource usage of the selected source server and a remaining amount of the resource capacity of the selected destination server. If the comparison-object usage is more than the remaining amount, the processor selects another destination server and then makes the comparison again. If the comparison-object usage is not more than the remaining amount, the processor allocates the selected source server to the selected destination server.

20 Claims, 27 Drawing Sheets

Fig. 5

DS: SOURCE OPERATION DATA

| SOURCE SERVER ID(i) | RESOURCE USAGE |
|---|---|
| 0 | 17 |
| 1 | 23 |
| 2 | 29 |
| 3 | 11 |
| 4 | 14 |

Fig. 6

DD: DESTINATION CAPACITY DATA

| DESTINATION SERVER ID(j) | RESOURCE CAPACITY |
|---|---|
| 0 | 50 |
| 1 | 35 |
| DEFAULT | 40 |

Fig. 10

NUMBER OF SOURCE SERVERS: m=5

| SOURCE ID: i | 0 | 1 | 2 | 3 | 4 |
|---|---|---|---|---|---|
| RESOURCE USAGE: W(i) | 17 | 23 | 19 | 11 | 14 |
| ORDER: k | 2 | 0 | 1 | 4 | 3 |
| PROCESSING <CONDITION> ·N=2 ·U(0)=50 ·U(1)=35 ·U=40 | \#1: ·n=1, ·A(1)=0, ·X(0)=23 → \#2: ·n=1, ·A(2)=0, ·X(0)=42 → \#3: ·n=2, ·A(0)=1, ·X(1)=17 → \#4: ·n=2, ·A(4)=1, ·X(1)=31 → \#5: ·n=3, ·A(3)=2, ·X(2)=11 | | | | |
| DESTINATION ID: A(i)=j | 1 | 0 | 0 | 2 | 1 |

NUMBER OF DESTINATION SERVERS: n=3

Fig. 14

NUMBER OF SOURCE SERVERS: m=5

| SOURCE ID: i | 0 | 1 | 2 | 3 | 4 |
|---|---|---|---|---|---|
| RESOURCE USAGE: W(i) | 17 | 23 | 19 | 11 | 14 |
| ORDER: k | 2 | 0 | 1 | 4 | 3 |
| PROCESSING<br><br><CONDITION><br>・N=2<br>・U(0)=50<br>・U(1)=35<br>・U=40<br>・T(0)=1<br>・T(1)=0 | \#1: ・n=1, ・A(1)=1, ・X(1)=23<br>\#2: ・n=2, ・A(2)=0, ・X(0)=19<br>\#3: ・n=2, ・A(0)=0, ・X(0)=36<br>\#4: ・n=2, ・A(4)=0, ・X(0)=50<br>\#5: ・n=2, ・A(3)=1, ・X(1)=34 ||||| 
| DESTINATION ID: A(i)=j | 0 | 1 | 0 | 1 | 0 |

NUMBER OF DESTINATION SERVERS: n=2

Fig. 18

NUMBER OF SOURCE SERVERS: m=5

| SOURCE ID: i | 0 | 1 | 2 | 3 | 4 |
|---|---|---|---|---|---|
| RESOURCE USAGE: W(i) | 17 | 23 | 19 | 11 | 14 |
| ORDER: k | 2 | 0 | 1 | 4 | 3 |
| PROCESSING<br><br><CONDITION><br>· N=2<br>· U(0)=50<br>· U(1)=35<br>· U=40<br>· A(4)=0 | #1: · n=1, · A(1)=0, · X(0)=37<br>#2: · n=2, · A(2)=1, · X(1)=19<br>#3: · n=3, · A(0)=2, · X(2)=17<br>#4: · Skip<br>#5: · n=3, · A(3)=0, · X(0)=48 ||||||
| DESTINATION ID: A(i)=j | 2 | 0 | 1 | 0 | 0(fix) |

NUMBER OF DESTINATION SERVERS: n=3

Fig. 22

NUMBER OF SOURCE SERVERS: m=5

| SOURCE ID: i | 0 | 1 | 2 | 3 | 4 |
|---|---|---|---|---|---|
| RESOURCE USAGE: $W(i)$ | 17 | 23 | 19 | 11 | 14 |
| ORDER: k | 2 | 0 | 1 | 4 | 3 |
| PROCESSING <CONDITION> · N=2 · U(0)=50 · U(1)=35 · U=40 · A(4)=0 · T(0)=1 · T(1)=0 | #1: · n=1, · A(1)=1, · X(1)=23 → #2: · n=2, · A(2)=0, · X(0)=33 → #3: · n=2, · A(0)=0, · X(0)=50 → #4: · Skip → #5: · n=2, · A(3)=1, · X(1)=34 | | | | |
| DESTINATION ID: $A(i)=j$ | 0 | 1 | 0 | 1 | 0(fix) |

NUMBER OF DESTINATION SERVERS: n=2

Fig. 25

NUMBER OF SOURCE SERVERS: m=5

| SOURCE ID: i | 0 | 1 | 2 | 3 | 4 |
|---|---|---|---|---|---|
| RESOURCE USAGE: W(i) | 17 | 23 | 19 | 11 | 14 |
| AFTER ADDITION: W(i) | 40 | 0 | 19 | 11 | 14 |
| ORDER: k | 0 | 4 | 1 | 3 | 2 |
| PROCESSING<br><br><CONDITION><br>· N=2<br>· U(0)=50<br>· U(1)=35<br>· U=40<br>· A(4)=0<br>· A(0)=A(1)<br>· T(0)=1<br>· T(1)=0 | colspan=5: #1: ·n=3, ·A(0)=2, ·X(2)=40 → #2: ·n=3, ·A(2)=1, ·X(1)=19 → #3: ·Skip → #4: ·n=3, ·A(3)=1, ·X(1)=30 → #5: ·n=3, ·A(1)=1, ·X(1)=30 | | | | |
| DESTINATION ID: A(i)=j | 2 | 1 | 1 | 1 | 0(fix) |
| AFTER ADJUSTMENT: A(i)=j | 2 | 2 | 1 | 1 | 0(fix) |

NUMBER OF DESTINATION SERVERS: n=3

Fig. 28

NUMBER OF SOURCE SERVERS: m=5

| SOURCE ID: i | 0 | 1 | 2 | 3 | 4 |
|---|---|---|---|---|---|
| RESOURCE USAGE: W(i) | 17 | 23 | 19 | 11 | 14 |
| ORDER: k | 2 | 0 | 1 | 4 | 3 |
| PROCESSING<br><br><CONDITION><br>·N=2<br>·U(0)=50<br>·U(1)=35<br>·U=40<br>·A(4)=0<br>·T(0)=1<br>·T(1)=0<br>·A(1)≠1<br>·A(2)≠A3 | \#1: ·n=2, ·A(1)=0, ·X(0)=37 → \#2: ·n=2, ·A(2)=1, ·X(1)=19 → \#3: ·n=3, ·A(0)=2, ·X(2)=17 → \#4: ·Skip → \#5: ·n=3, ·A(3)=0, ·X(0)=48 | | | | |
| DESTINATION ID: A(i)=j | 2 | 0 | 1 | 0 | 0(fix) |

NUMBER OF DESTINATION SERVERS: n=3

SERVER MIGRATION PLANNING SYSTEM AND SERVER MIGRATION PLANNING METHOD

CROSS-REFERENCE TO RELATED APPLICATION

This application is based upon and claims the benefit of priority from Japanese patent application No. 2007-043787, filed on Feb. 23, 2007, the disclosure of which is incorporated herein in its entirely by reference.

TECHNICAL FIELD

The present invention relates to a technique for server migration. In particular, the present invention relates to a system, a method and a program for creating a server migration plan.

BACKGROUND ART

According to the virtualization technology using virtualization software such as VMware and Xen, it is possible to make one physical server to operate as a plurality of virtual severs. As a result, it becomes easier to streamline a server operation according to the situation (refer to Japanese Laid Open Patent Application JP-P2005-115653A). It is also possible by using the virtualization technology to achieve "server migration" easily. The server migration is exemplified as follows.

FIG. 1 conceptually shows "server consolidation" as one example of the server migration. As shown in FIG. 1, let us consider a case where existing five physical servers M1 to M5 are operating and these five physical servers M1 to M5 are consolidated into three high-performance physical servers M6 to M8. For example, the physical servers M1 and M2 are respectively replaced with virtual servers VM1 and VM2 which run on the physical server M6. Also, the physical server M3 is replaced with a virtual server VM3 which runs on the physical server M7. Moreover, the physical servers M4 and M5 are respectively replaced with virtual servers VM4 and VM5 which run on the physical server M8. In the example shown in FIG. 1, the five physical servers M1 to M5 constitute a "source server group", while the three physical servers M6 to M8 constitute a "destination server group". Such the server consolidation can reduce occupation space and electric power consumption due to the decrease in the number of physical servers, which greatly contributes to reduction of operation management costs.

FIG. 2 conceptually shows "server reallocation" as another example of the server migration. As shown in FIG. 2, let us consider a case where a server operation is carried out with virtual servers VM1 to VM5 which run on physical servers M1 to M3. In the daytime when load is increased, the virtual servers VM1 and VM2 are built on the physical server M1, the virtual servers VM3 and VM4 are built on the physical server M2, and the virtual server VM5 is built on the physical server M3. On the other hand, in the nighttime when load is decreased, the virtual servers VM1, VM2 and VM4 are built on the physical server M1, the virtual servers VM3 and VM5 are built on the physical server M2, and thus the physical server M3 is not used. In this manner, the number of physical servers used is reduced depending on the situation, which can reduce the operation management costs. In the example shown in FIG. 2, the virtual servers VM1 to VM5 in the daytime or the nighttime constitute a "source server group", while the physical servers M1 to M3 constitute a "destination server group".

As described above, the server migration is important from the viewpoint of the reduction of the operation management costs. In advance of the server migration, it is necessary not only to estimate the number of servers under the post-migration situation but also to prepare a "migration plan" that indicates "to which destination server, each source server is allocated", i.e., an allocation relationship between the source servers and the destination servers. A fundamental condition that the migration plan should meet is an inclusion relation between computer resources. That is to say, the sum of "resource usage" of source servers which are to be allocated to a certain destination server must not exceed "resource capacity" of the certain destination server. Here, the computer resources include a CPU, disk, memory and network.

Also, a migration plan with which the number of servers under the post-migration situation becomes as small as possible is preferable from the viewpoint of the costs. When goods of various sizes are packed in bins with the same constant capacity, a problem of finding a minimum number of bins necessary for packing the set of goods is generally called a "Bin Packing Problem (BPP)". With regard to the Bin Packing Problem, it is well known that to find an optimum solution within a practical time is extremely difficult. A "First-Fit-Decrease (FFD) algorithm" is known as an approximate solution algorithm (refer to "Combinatorial Optimization: Theory and Algorithms", written by B. Korte and J. Vygen, translated by Takao Asano et al., Springer-Verlag Tokyo, Nov. 3, 2005, pp. 470-472).

A load balancing technique with respect to a parallel computer is described in Japanese Laid Open Patent Application JP-A-Heisei, 10-27167. The parallel computer consists of a plurality of computers and executes a parallel program composed of a plurality of constitutive programs. When the plurality of constitutive programs are allocated to the plurality of computers, the load balancing is performed in consideration of the load applied to the computer by the constitutive program itself. More specifically, a history collecting program collects resource utilization of each constitutive program. Moreover, a scheduler refers to current resource utilization of each computer and allocates a constitutive program with the larger resource utilization to a computer with the smaller current resource utilization. In other words, the scheduler allocates processing with a heavier load to a computer with a larger available capacity.

SUMMARY

An exemplary object of the invention is to provide a technique that can mechanically plan server migration to destination servers whose number is within an appropriate range.

According to exemplary embodiments of the invention, a server migration technique is provided. More specifically, a technique for planning server migration from m source servers to at least N destination servers is provided. Here, the m is an integer not less than 2, and the N is an integer not less than 1.

In a first exemplary aspect of the invention, a server migration planning system is provided. The server migration planning system comprises a memory device and a processor. Stored in the memory device are a first data indicating resource usage of the respective source servers and a second data indicating resource capacity of the respective destination servers. The processor allocates the respective source servers to any ones of the destination servers, based on the first data and the second data. More specifically, the processor performs the following packing processing. That is, the processor selects the source servers one-by-one in descending order of the resource usage, and selects any one of the destination servers. Then, the processor makes a comparison between a comparison-object usage, which is the resource usage of the selected source server, and a remaining amount of the resource capacity of the selected destination server. In a case where the comparison-object usage is more than the remaining amount, the processor selects another destination server different from the selected destination server and then carries out the above-mentioned comparison again. On the other hand, in a case where the comparison-object usage is not more than the remaining amount, the processor allocates the selected source server to the selected destination server.

In a second exemplary aspect of the invention, a server migration planning method is provided. The server migration planning method includes: (A) reading a first data indicating resource usage of the respective source servers from a memory device; (B) reading a second data indicating resource capacity of the respective destination servers from a memory device; and (C) allocating the respective source servers to any ones of the destination servers, based on the first data and the second data. The above-mentioned (C) allocating includes: (C1) selecting the source servers one-by-one in descending order of the resource usage and selecting any one of the destination servers; (C2) making a comparison between a comparison-object usage, which is the resource usage of the selected source server, and a remaining amount of the resource capacity of the selected destination server; (C3) carrying out the above-mentioned comparison again after selecting another destination server different from the selected destination server, in a case where the comparison-object usage is more than the remaining amount; and (C4) allocating the selected source server to the selected destination server, in a case where the comparison-object usage is not more than the remaining amount.

In a third exemplary aspect of the invention, a server migration planning program recorded on a computer-readable medium is provided. When executed, the server migration planning program causes a computer to perform a method of planning server migration. The method includes: (A) reading a first data indicating resource usage of the respective source servers from a memory device; (B) reading a second data indicating resource capacity of the respective destination servers from a memory device; and (C) allocating the respective source servers to any ones of the destination servers, based on the first data and the second data. The above-mentioned (C) allocating includes: (C1) selecting the source servers one-by-one in descending order of the resource usage and selecting any one of the destination servers; (C2) making a comparison between a comparison-object usage, which is the resource usage of the selected source server, and a remaining amount of the resource capacity of the selected destination server; (C3) carrying out the above-mentioned comparison again after selecting another destination server different from the selected destination server, in a case where the comparison-object usage is more than the remaining amount; and (C4) allocating the selected source server to the selected destination server, in a case where the comparison-object usage is not more than the remaining amount.

According to the technique thus described, it is possible to mechanically plan server migration to destination servers whose number is within an appropriate range. As a result, burden on a system designer is reduced and a time required to accomplish the server migration is reduced.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 5 is a table showing one example of a source operation data;

FIG. 6 is a table showing one example of a destination capacity data;

FIG. 10 is a schematic diagram showing an example of creating a migration plan in the first exemplary embodiment;

FIG. 14 is a schematic diagram showing an example of creating a migration plan in the second exemplary embodiment;

FIG. 18 is a schematic diagram showing an example of creating a migration plan in the third exemplary embodiment;

FIG. 22 is a schematic diagram showing an example of creating a migration plan in the fourth exemplary embodiment;

FIG. 25 is a schematic diagram showing an example of creating a migration plan in the fifth exemplary embodiment;

FIG. 28 is a schematic diagram showing an example of creating a migration plan in the sixth exemplary embodiment.

EXEMPLARY EMBODIMENTS

Exemplary embodiments of the present invention will be described below with reference to the attached drawings.

Figure 1:
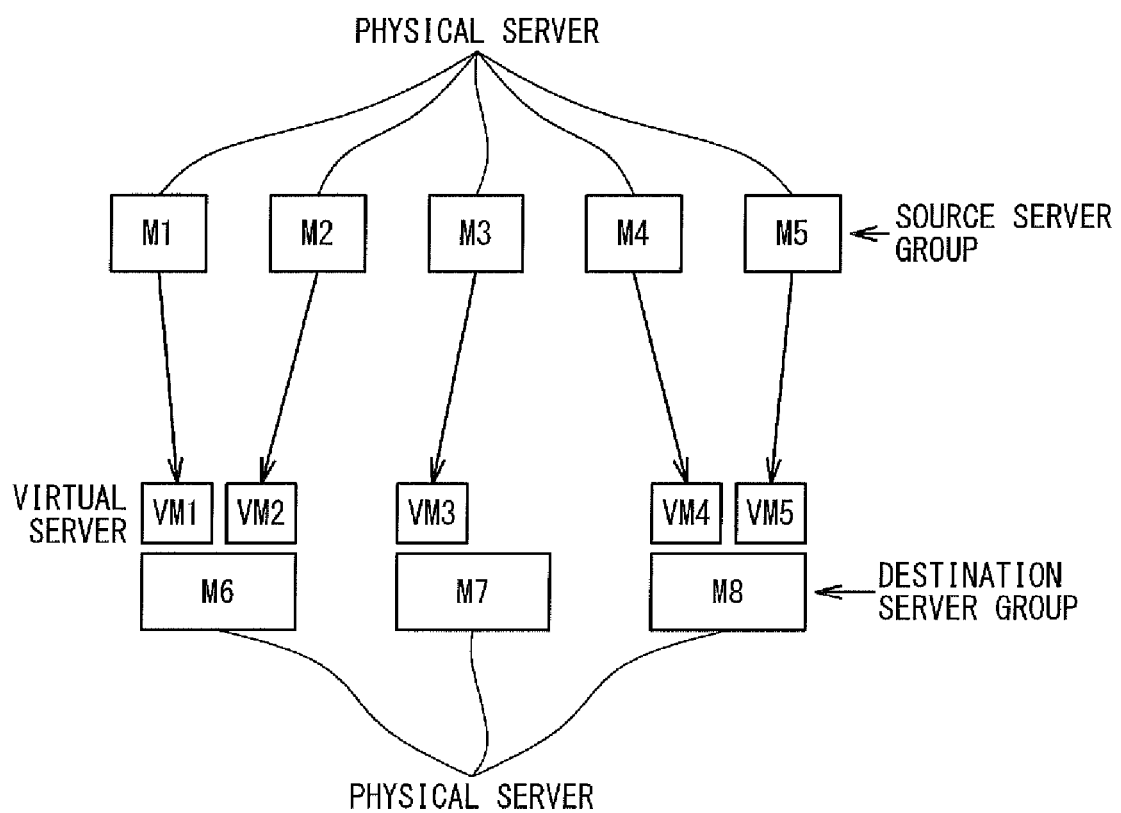
FIG. 1 is a conceptual diagram showing one example of server migration.
Figure 2:
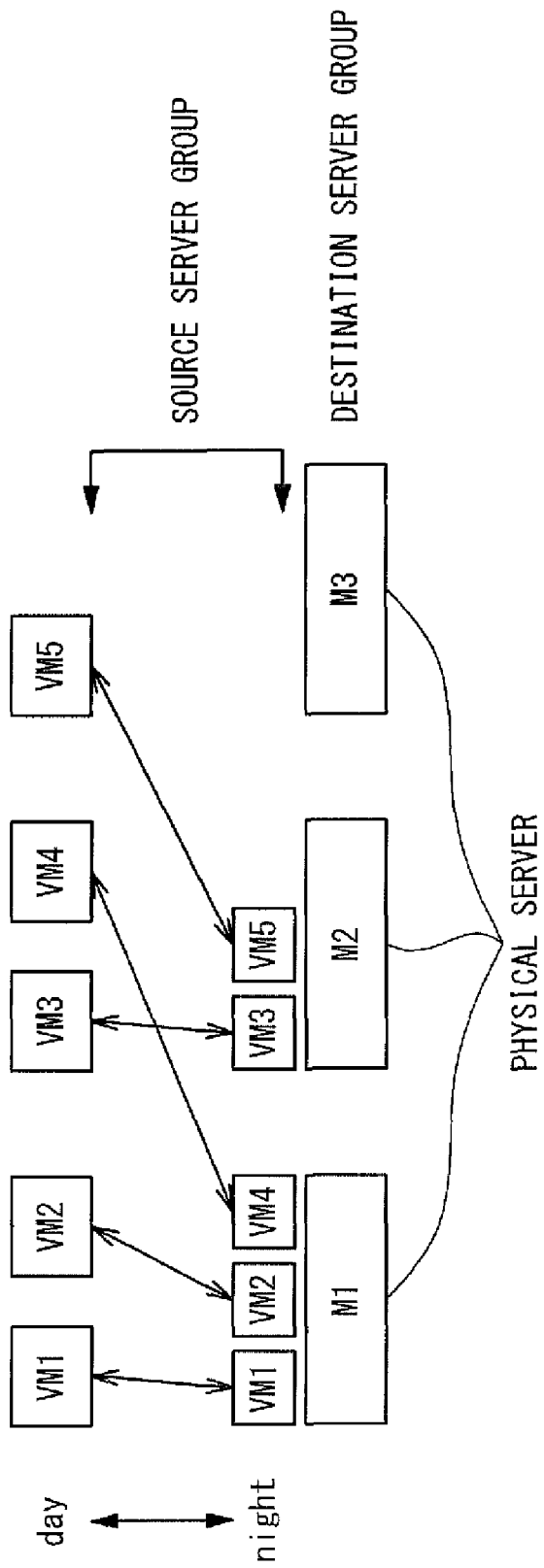
FIG. 2 is a conceptual diagram showing another example of server migration.
Figure 3:
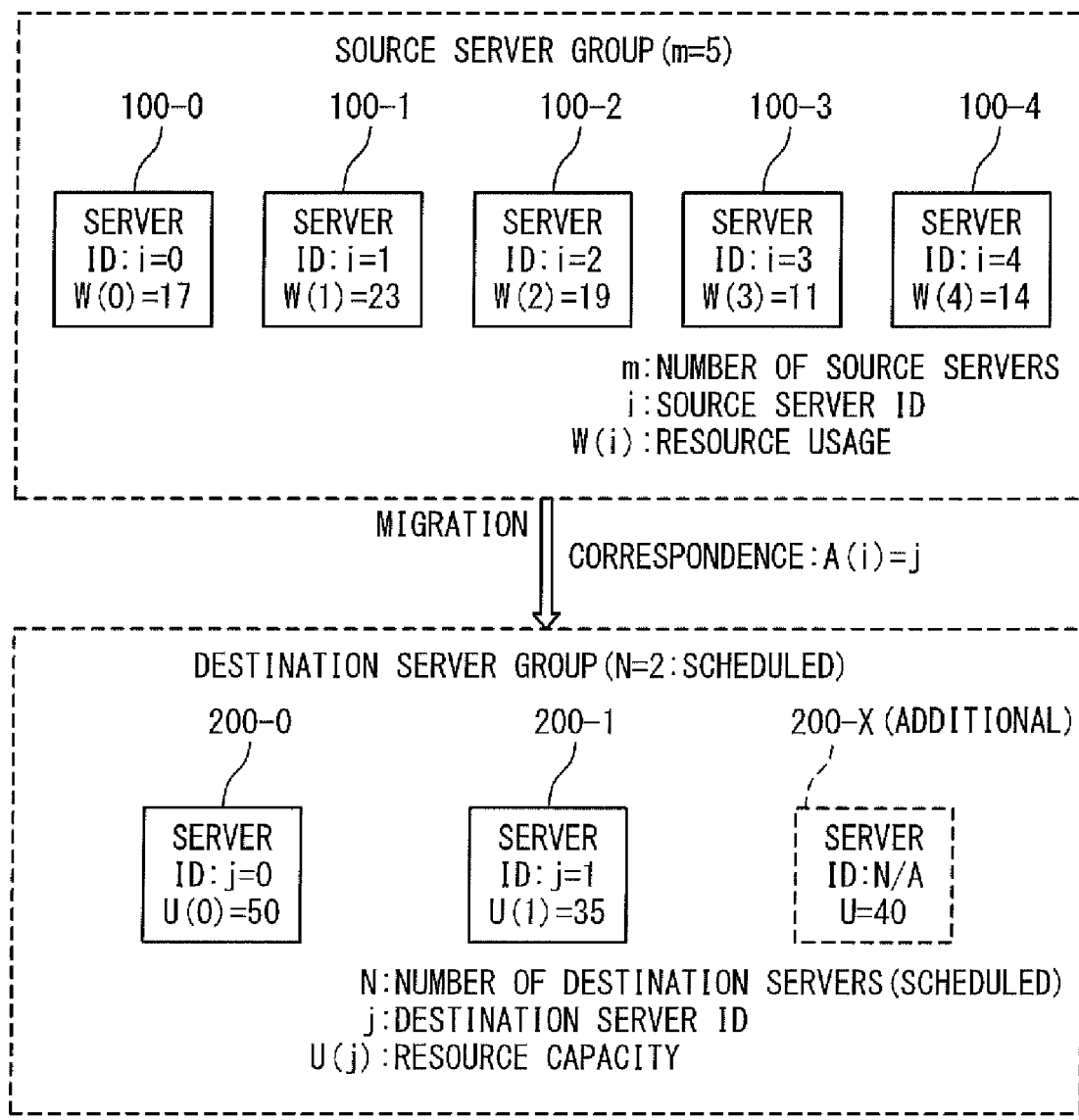
FIG. 3 is a conceptual diagram showing server migration according to exemplary embodiments of the present invention.

FIG. 3 conceptually shows server migration. A source server group is constituted by m servers 100-0 to 100-(m−1). The m is an integer not less than 2. Let us consider a case where N servers 200-0 to 200-(N−1) are scheduled to be used as destinations of the m source servers 100. The N is an integer not less than 1 and is preferably smaller than the m. For example, the m is 5 and the N is 2. Note that if the N destination servers 200 are not enough, an additional destination server 200-X different from the N destination servers 200 will be added. That is to say, the m source servers 100 are migrated to at least N destination servers 200.

Each server may be a real machine (physical server) or may be a virtual machine (virtual server) achieved by the virtualization technology. Each server uses computer resource such as a CPU, a disk, a memory and a network. It is therefore possible to define "resource usage" with respect to each source server 100, where the resource usage means the amount of computer resource that has been used by the source server 100. On the other hand, it is possible to define "resource capacity" with respect to each destination server 200, where the resource capacity means the allowable amount of computer resource that is used by the destination server 200, i.e., the usable (available) amount of computer resource.

One example of the resource usage is CPU usage. The CPU usage is given by the product of "CPU relative performance value" and "CPU utilization". For example, when a source server 100 is equipped with a CPU relative performance of "80" and has operated with a CPU utilization of up to "60%", the resource usage of the source server 100 is calculated to be "48 (=80×0.60)". The resource capacity of the destination server 200 can be defined in the same way. For example, when a destination server 200 equipped with a CPU relative performance of "120" is scheduled to be used and operated with a CPU utilization of up to "75%", the resource capacity of the destination server 200 is calculated to be "90 (=120×0.75)".

As shown in FIG. 3, an integer i (=0 to (m−1)) as an ID number is given to each of the source servers 100. The resource usage of the source server i is represented by W(i). In the example shown in FIG. 3, W(0)=17, W(1)=23, W(2)=19, W(3)=11 and W(4)=14. Similarly, an integer j (=0 to (N−1)) as an ID number is given to each of the destination servers 200. The resource capacity of the destination server j is represented by U(j). In the example shown in FIG. 3, U(0)=50 and U(1)=35. Note that the resource capacity U of the additional server 200-X is a default value of 40.

In advance of the server migration, it is necessary to prepare (create) a "migration plan" that indicates "to which destination server 200, each source server 100 is allocated", i.e., an allocation relationship between the source servers 100 and the destination servers 200. In other words, it is necessary to determine a correspondence relationship (A(i)=j) between the source ID number i and the destination ID number j. A fundamental condition that the migration plan should meet is an inclusion relation between the above-mentioned computer resources. That is to say, the sum of resource usage W(i) of the source servers i which are to be allocated to a certain destination server j must not exceed the resource capacity U(j) of the certain destination server j. The number of servers under the post-migration situation is hereinafter referred to as "n", and a migration plan with which the number n becomes as small as possible is preferable from the viewpoint of the costs. To create a suitable migration plan that satisfies the above-mentioned conditions, namely, to determine a suitable correspondence relationship A(i)=j is one object of the exemplary embodiment of the present invention.

Figure 4:
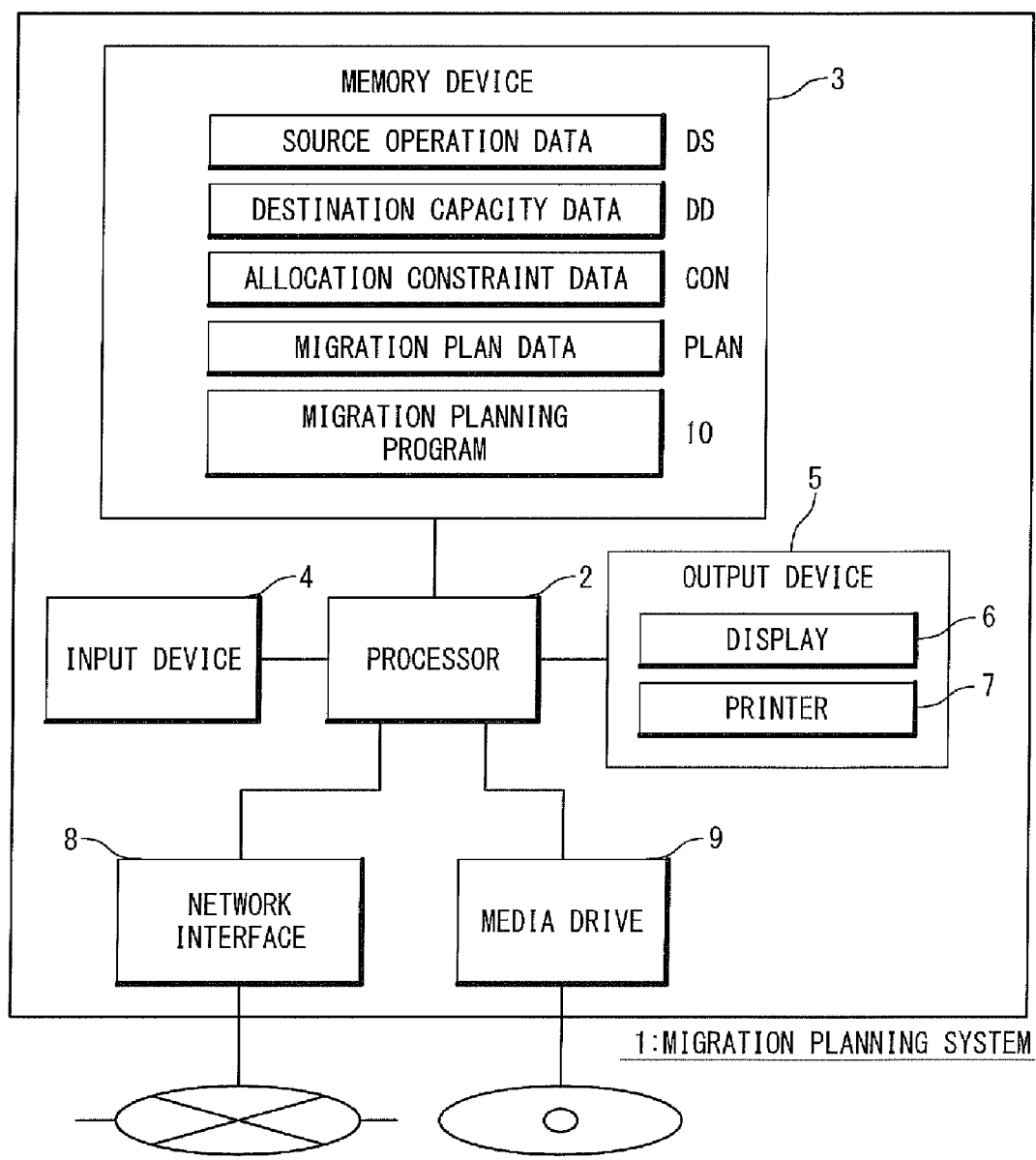
FIG. 4 is a block diagram showing a configuration example of a migration planning system according to exemplary embodiments of the present invention.

FIG. 4 shows one example of a migration planning system 1 for creating the migration plan. The migration planning system 1 is a computer system and is constructed on, for example, a management server. The migration planning system 1 is provided with a processor 2, a memory device 3, an input device 4, an output device 5, a network interface 8 and a media drive 9. The processor 2 including a CPU executes various processing and controls operations of the respective devices. The memory device 3 includes a RAM and a hard disk. The input device 4 is exemplified by a keyboard and a mouse. The output device 5 includes a display 6 and a printer 7. A user can refer to information displayed on the display 6 and input various data and commands by using the input device 4.

A source operation data DS, a destination capacity data DD and an allocation constraint data CON are stored in the memory device 3. These data may be input with the input device 4 or may be provided through the network interface 8. Or, those data may be recorded on a computer-readable recording medium and read by the media drive 9.

The source operation data DS is a data indicating the resource usage of the respective source servers 100. FIG. 5 shows one example of the source operation data DS. As shown in FIG. 5, the source operation data DS indicates a correspondence between the source server i and its resource usage W(i). The resource usage W(i) can be obtained based on past operation results or predicted values, for example.

The destination capacity data DD is a data indicating the resource capacity of the respective destination servers 200. FIG. 6 shows one example of the destination capacity data DD. As shown in FIG. 6, the destination capacity data DD indicates a correspondence between the destination server j and its resource capacity U(j). The destination capacity data DD further indicates the default value U (=40) which is the resource capacity of the additional server 200-X that may be added as necessary. The resource capacity U(j) and U can be obtained based on the performance of the respective destination servers 200. It should be noted here that the respective resource capacity U(j) can be different from each other, as shown in FIG. 6. In the above-mentioned Bin Packing Problem, the bins have the same constant capacity. In the actual server migration, however, a plurality of destination servers having different resource capacity are used in many cases. According to the exemplary embodiments of the invention, it is possible to create a migration plan even if the respective resource capacity U(j) are different from each other.

The allocation constraint data CON is a data indicating "allocation constraint" of the allocation relationship (A(i)=j) between the source servers i and the destination servers j. Examples of the allocation constraint include "a specified source server is migrated to a specified destination server", "specified two source servers must not be migrated to the same destination server". The details will be described later.

Referring back to the foregoing FIG. 4, a migration plan data PLAN is further stored in the memory device 3. The migration plan data PLAN is a data indicating the "migration plan" created by the migration planning system 1.

Furthermore, a migration planning program 10 is stored in the memory device 3. The migration planning program 10 is software executed by the processor 2. For example, the migration planning program 10 is recorded on a computer-readable recording medium and read by the media drive 9. Or, the migration planning program 10 may be provided through the network interface 8.

By executing the migration planning program 10, the processor 2 achieves the migration planning processing according to the exemplary embodiments of the present invention. That is to say, the processor 2 reads the various data DS, DD and CON from the memory device 3, and sets the destinations A(i) of the respective source servers i to any ones of the destination servers j based on the read data. As a result, the migration plan data PLAN is created. The migration plan data PLAN indicates the determined allocation relationship (A(i)=j), the required number n of the destination servers, estimated values of the resource usage of the respective destination servers and the like. The migration plan data PLAN is output to the outside by the output device 5.

Various exemplary embodiments of the migration planning processing according to the present invention will be described below in more detail. In the description, the case shown in the foregoing FIGS. 3 to 6 will be used as an example.

1. First Exemplary Embodiment

Figure 7:
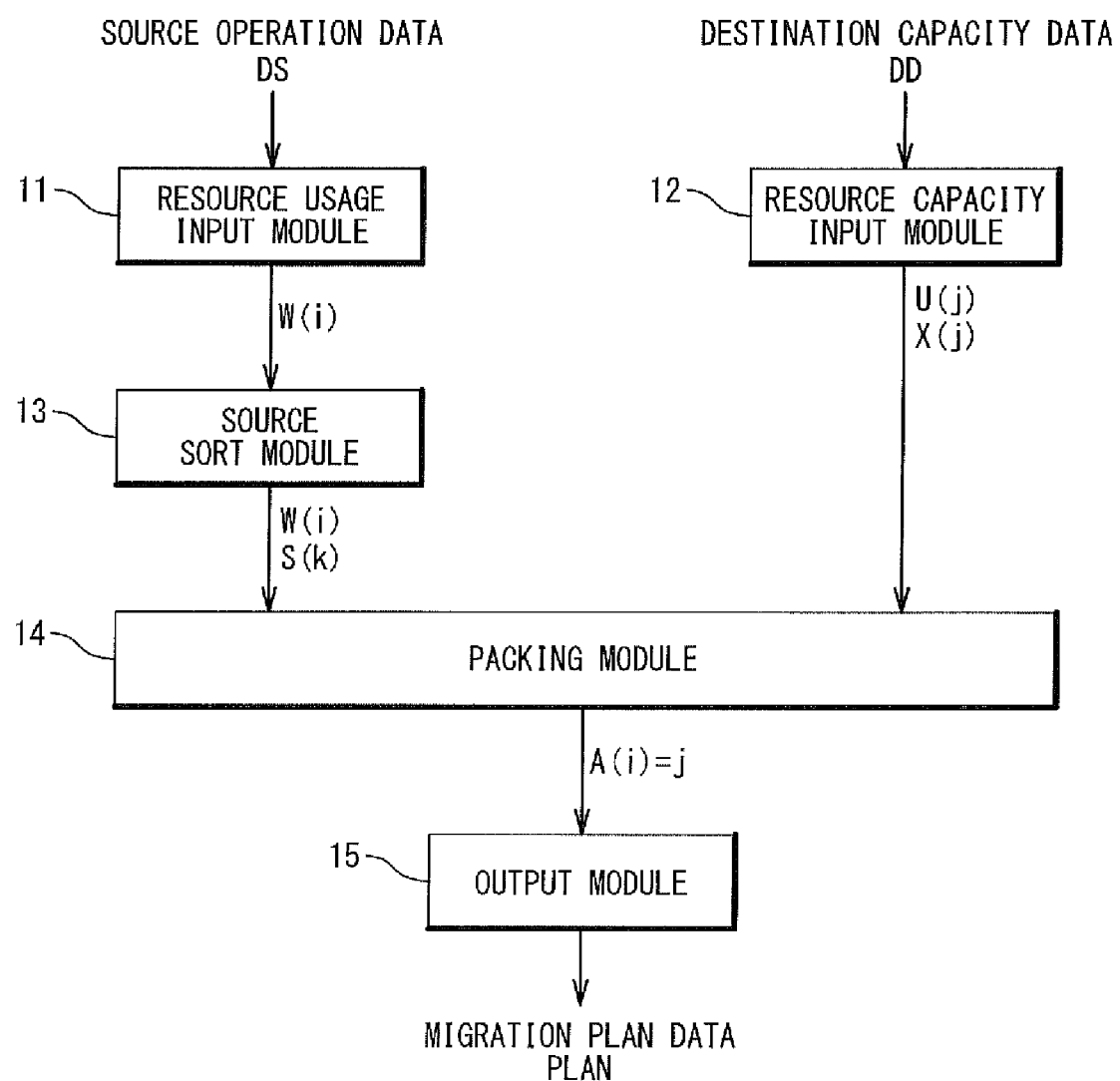
FIG. 7 is a block diagram showing a configuration and processing of the migration planning system according to a first exemplary embodiment.
Figure 8:
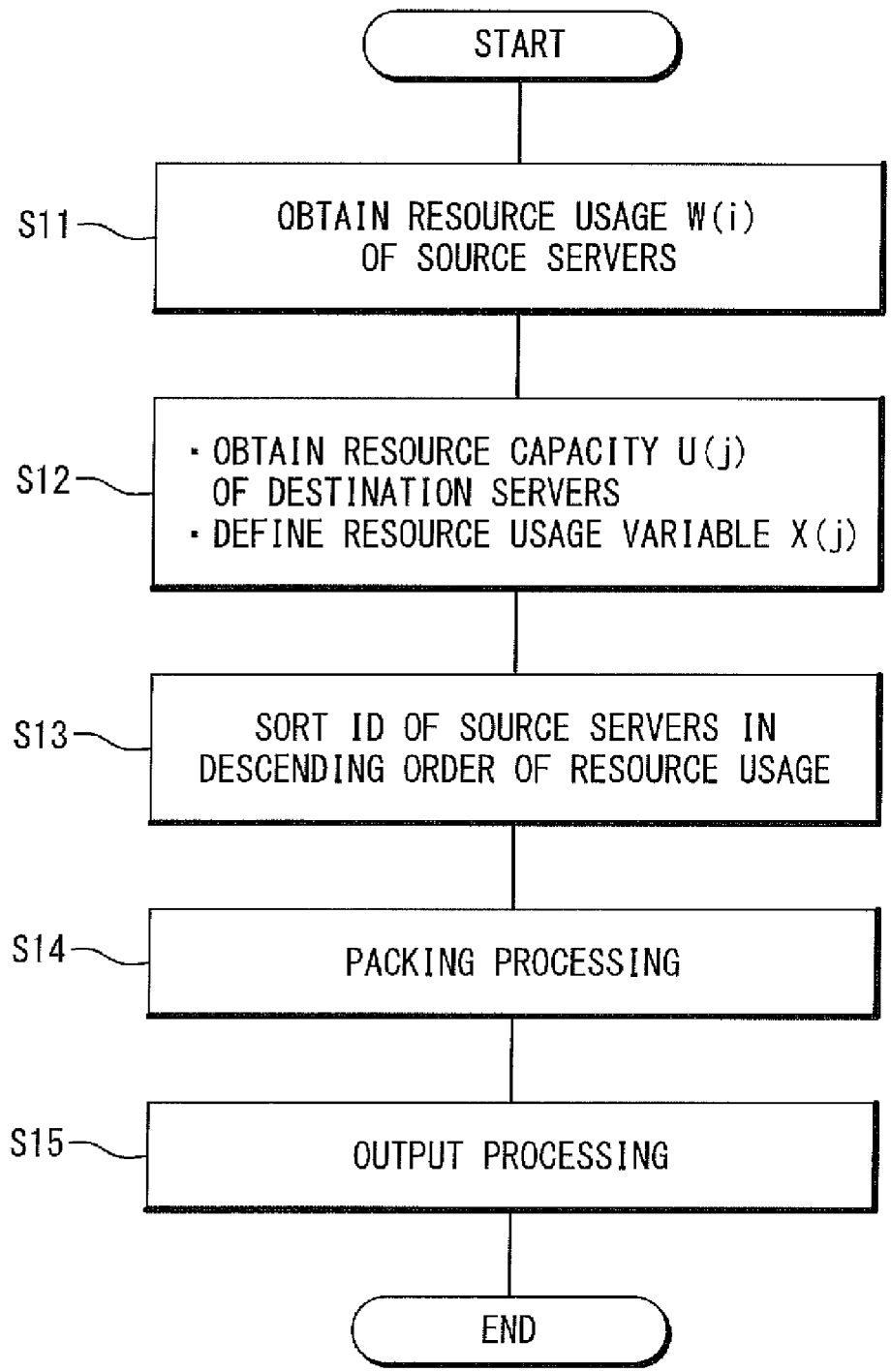
FIG. 8 is a flowchart showing a migration planning method according to the first exemplary embodiment.

FIG. 7 shows a first exemplary embodiment of the migration planning processing. In the first exemplary embodiment, a resource usage input module 11, a resource capacity input module 12, a source sort module 13, a packing module 14 and an output module 15 are provided due to a cooperation of the processor 2 and the migration planning program 10. FIG. 8 shows a processing flow achieved by these modules. A comprehensive description of the migration planning processing will be first given with reference to FIGS. 7 and 8.

Step S11:

The resource usage input module 11 reads the source operation data DS from the memory device 3. The source operation data DS indicates the respective resource usage (17, 23, 19, 11 and 14) of the source servers i. The resource usage input module 11 stores the respective resource usage in the variable W(i).

Step S12:

The resource capacity input module 12 reads the destination capacity data DD from the memory device 3. The destination capacity data DD indicates the respective resource capacity (50 and 35) of the destination servers j and the default value (40). The resource capacity input module 12 stores the respective resource capacity and the default value in the variable U(j) and the variable U. Moreover, the resource capacity input module 12 defines a variable X(j) with respect to each of the destination servers j. The variable X(j) indicates the sum of the resource usage W(i) of the source servers i which are allocated to a destination server j. In other words, the variable X(j) indicates an estimated value of the resource usage of the destination server j. At the present stage, all of the variables X(j) are initialized to be 0. Hereafter, the variable X(j) is referred to as an "consumed resource amount X(j)".

Step S13:

The source sort module 13 sorts the source servers i in descending order of the resource usage W(i). Moreover, the source sort module 13 stores the sort result in an array S. Each element of the array S is represented by S(k) (k=0 to m−1). In this case, an element S(0) indicates the ID number i of the source server whose resource usage W(i) is the maximum, while an element S(m−1) indicates the ID number i of the source server whose resource usage W(i) is the minimum. In the present example, S=[1, 2, 0, 4, 3], W(S(0))=W(1)=23, W(S(1))=W(2)=19, W(S(2))=W(0)=17, W(S(3))=W(4)=14, and W(S(4))=W(3)=11. As described later, the array S=[1, 2, 0, 4, 3] gives the order of the allocation processing.

Step S14:

The packing module 14 performs "packing processing" by the use of the resource usage W(i), the array S, the resource capacity U(j), U and the consumed resource amount X(j). In the packing processing, the packing module 14 sets the destinations A(i) of the respective source servers i to any of the destination servers j. As a result, the allocation relationship (A(i)=j), the required number n of the destination servers and the final consumed resource amount X(j) are determined.

Step S15:

The output module 15 stores the created migration plan data PLAN in the memory device 3 and also outputs it to the output device 5.

Figure 9:
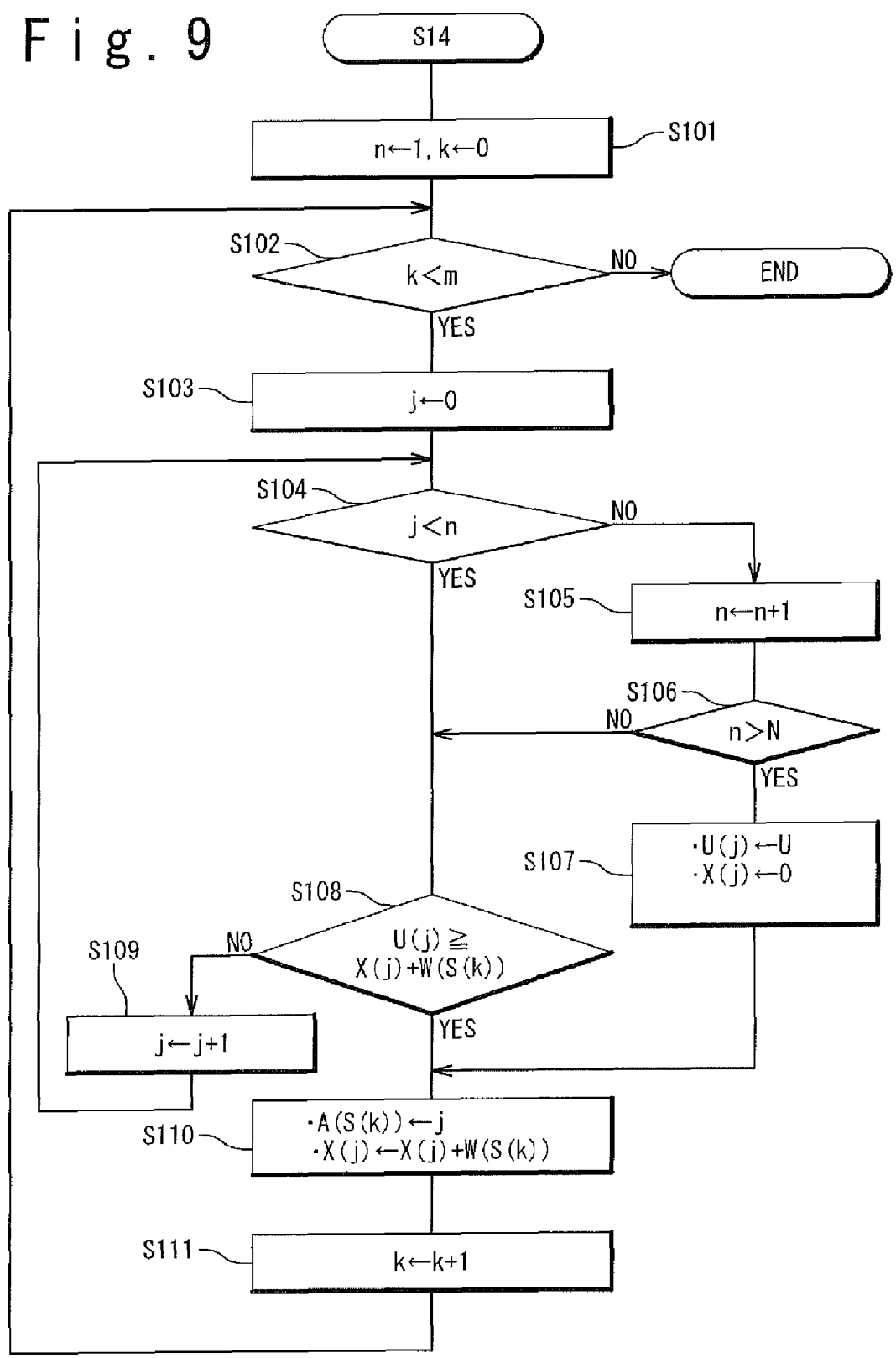
FIG. 9 is a flowchart showing packing processing in the first exemplary embodiment.

Next, the above-mentioned packing processing (Step S14) will be described in more detail. FIG. 9 is a flowchart showing the packing processing in the first exemplary embodiment. FIG. 10 is a schematic diagram showing an example of creating a migration plan. As shown in FIG. 10, the parameter k indicating the element of the array S represents the order of the magnitude of the resource usage W(i), and k=0, 1, 2, 3, 4 correspond to i=1, 2, 0, 4, 3, respectively.

First, the parameter n indicating the required number of servers is initialized to be 1. Also, the above-mentioned parameter k is initialized to be 0 (Step S101). The parameter k is used as a counter for the after-mentioned loop processing, and is increased from the initial value 0 by one at a time. In a single loop processing, a source server i of the ID number given by S(k) is allocated to any one of the destination servers j. When the allocation processing for all the source servers i is completed (Step S102; No), the loop processing ends and Step S14 is completed.

Since the parameter k is increased by one at a time from the initial value 0, the object (target) of the allocation processing changes in the order of the ID number i=1, 2, 0, 4 and 3. That is to say, the source servers i are selected one-by-one as the object of the allocation processing in descending order of the resource usage W(i). By carrying out the allocation processing in descending order of the resource usage W(i), it is possible to allocate all the source servers i to a smaller number of the destination servers j. This is based on the heuristics in the Bin Packing Problem; first arrange the larger one and then arrange the smaller one in empty space, which results in a smaller number of bins.

(First Loop Processing: k=0, i=S(0)=1)

First, the destination server (j=0) is selected (Step S103). At this time, the j is smaller than the n (Step S104; Yes), and the processing proceeds to Step S108.

At Step S108, the resource capacity U(j) is compared with the sum of the consumed resource amount X(j) and the resource usage W(i). This means a comparison between the resource usage W(i) of the selected source server i and a remaining amount (=U(j)−X(j)) of the resource capacity of the selected destination server j. Hereafter, the resource usage W(i) of the comparison object may be referred to as "comparison-object usage W(i)". In the current loop processing, the comparison-object usage (W(1)=23) is compared with the remaining amount (U(0)−X(0)=50).

Since the comparison-object usage is not more than the remaining amount (Step S108; Yes), Step S110 is executed.

At Step S110, the selected source server (i=1) is allocated to the selected destination server (j=0). That is, an allocation relationship A(1)=0 is determined. At the same time, the comparison-object usage W(1) is added to the consumed resource amount X(0). In FIG. 10, a box to which a symbol # is given shows a result of each loop processing. The result of the first loop processing is shown in a box to which a symbol #1 is given. After that, the parameter k is incremented and the next source server S(1) is selected (Step S111).

(Second Loop Processing: k=1, i=S(1)=2)

The destination server (j=0) is selected again (Step S103). The processing proceeds in a similar way to the above-mentioned first loop processing, and the selected source server (i=2) is allocated to the selected destination server (j=0) (Step S110). That is, an allocation relationship A(2)=0 is determined, and the consumed resource amount X(0) becomes 42 (=23+19) (refer to #2 in FIG. 10). Then, the next source server S(2) is selected (Step S111).

(Third Loop Processing: k=2, i=S(2)=0)

The destination server (j=0) is selected again (Step S103). In the comparison (Step S108), the comparison-object usage (W(0)=17) is more than the remaining amount (U(0)−X(0) =50−42=8) (Step S108; No). In this case, the parameter j is increased by one (Step S109). That is, the next destination server (j=1) is selected. In this manner, the parameter j is initialized each time the loop processing is started and is increased by one at a time as necessary. Consequently, the destination server j as the object of the comparison is selected from the N destination servers in the same order for each loop processing.

Since the new destination server (j=1) is selected, 1 is added to the required number n (Step S104; No, Step S105). As a result, the required number n becomes 2. At this time, the two destination servers that are scheduled to be used are still sufficient (Step S106; No). Therefore, the processing proceeds to Step S108.

In the comparison (Step S108), the comparison-object usage (W(0)=17) is not more than the remaining amount (U(1)−X(1)=35) (Step S108; Yes). Therefore, the selected source server (i=0) is allocated to the selected destination server (j=1) (Step S110). That is, an allocation relationship A(0)=1 is determined, and the comparison-object usage W(0) is added to the consumed resource amount X(1) (refer to #3 in FIG. 10). Then, the next source server S(3) is selected (Step S111.

(Fourth Loop Processing: k=3, i=S(3)=4)

As in the above-mentioned third loop processing, the destination server (j=0) is first selected and then the next destination server (j=1) is selected. Since the required number n is already 2 (Step S104; Yes), Step S105 is not executed and the processing proceeds to Step S108. As a result, the selected source server (i=4) is allocated to the selected destination server (j=1) (Step S110). That is, an allocation relationship A(4)=1 is determined, and the consumed resource amount X(1) becomes 31 (=17+14) (refer to #4 in FIG. 10). Then, the next source server S(4) is selected (Step S111).

(Fifth Loop Processing: k=4, i=S(4)=3)

As in the above-mentioned fourth loop processing, the destination server (j=0) is first selected and then the next destination server (j=1) is selected. In the comparison (Step S108), the comparison-object usage (W(3)=11) is more than the remaining amount (U(1)−X(1)=35−31=4) (Step S108; No). Therefore, the parameter j is further increased by one, and thereby the parameter j becomes 2 (Step S109).

The comparison-object usage W(3) is more than the remaining amount of every one of the two destination servers which are scheduled to be used. In this case, 1 is further added to the required number n (Step S104; No, Step S105). Since the required number n becomes 3, the two destination servers that are scheduled to be used are insufficient (Step S106; Yes). In this case, the destination server 200-X having the predetermined resource capacity U is added as a new destination server (j=2) (Step S107). The resource capacity U(2) of the destination server (j=2) is set to the default value U (=40). Also, the consumed resource amount X(2) is set to the initial value 0.

After that, the processing proceeds to Step S110, and the selected source server (i=3) is allocated to the additional destination server (j=2). That is, an allocation relationship A(3)=2 is determined, and the comparison-object usage W(3) is added to the consumed resource amount X(2) (refer to #5 in FIG. 10).

After that, the parameter k becomes 5 at Step S111. This means that the allocation processing is completed with regard to all of the source servers (Step S102; No). Therefore, the loop processing is stopped and the packing processing (Step S14) is completed. Consequently, the allocation relationship "A(0)=1, A(1)=0, A(2)=0, A(3)=2, A(4)=1" is determined, as shown in FIG. 10. The required number n of the destination servers is 3. The resource usage scheduled to be used in the respective destination servers are X(0)=42, X(1)=31 and X(2) =11.

As described above, according to the present exemplary embodiment, it is possible to mechanically plan the server migration to destination servers whose number is within an appropriate range. In particular, it is possible to mechanically create a suitable server migration plan, even in the case where the resource capacity U(j) of the respective destination servers j are different from each other. As a result, burden on a system designer is reduced and a time required to accomplish the server migration is reduced.

Moreover, the following additional effect can also be obtained. In general, it is difficult to definitely set the scheduled number N of the destination servers in advance. If the scheduled number N is set to be too large, it can result in a wasted surplus in the processing ability of the N destination servers. This means the unnecessary increase in the number of servers after the server migration. Conversely, if the scheduled number N is set to be too small, it may become impossible to accept all the source servers. According to the present exemplary embodiment, however, the scheduled number N can be initially set to be small. The reason is that the additional destination server 200-X is automatically incorporated into the migration plan when the remaining amount of every one the scheduled N destination servers becomes insufficient (refer to Step S106 and Step S107). Since the new destination server is automatically added depending on the situation, the above-mentioned waste can be eliminated, which also contributes to the reduction of the number n of servers after the migration.

2. Second Exemplary Embodiment

Figure 11:
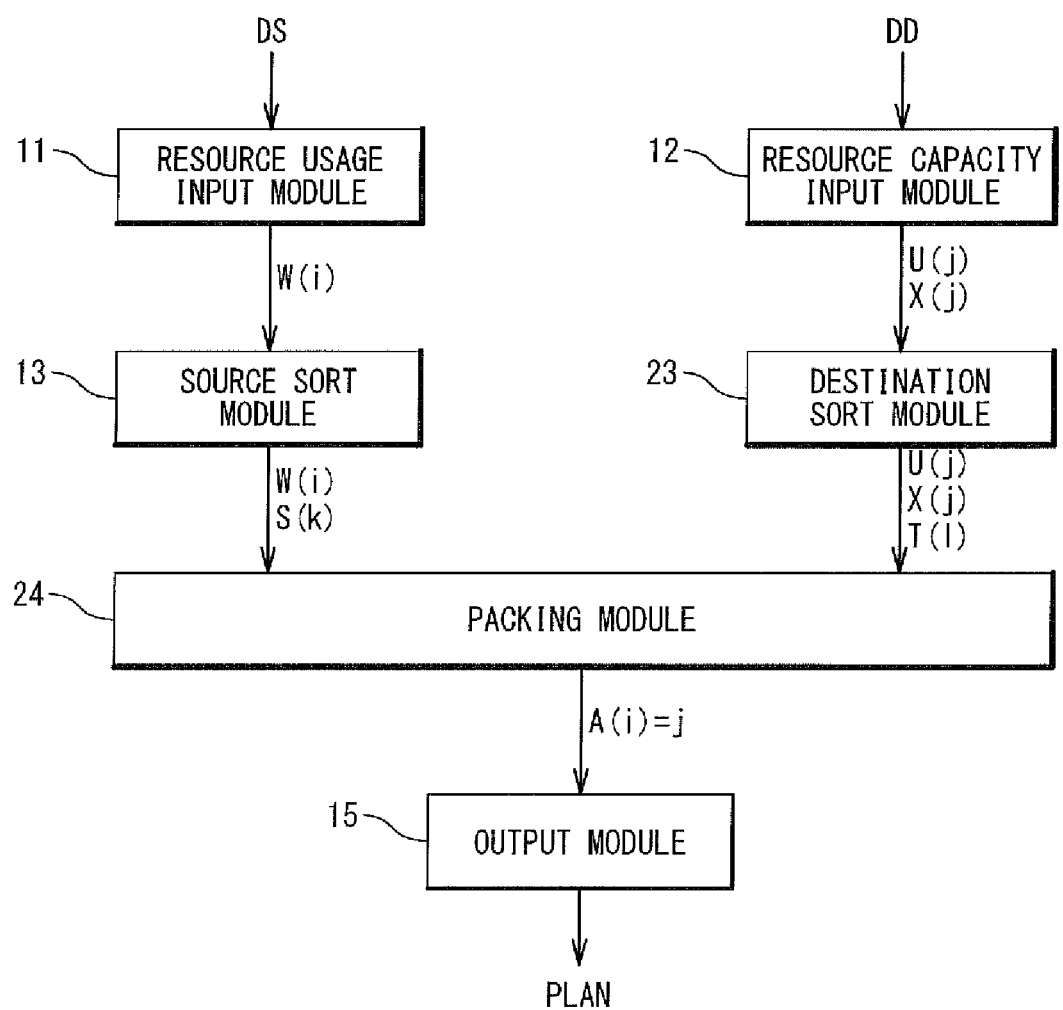
FIG. 11 is a block diagram showing a configuration and processing of the migration planning system according to a second exemplary embodiment.
Figure 12:
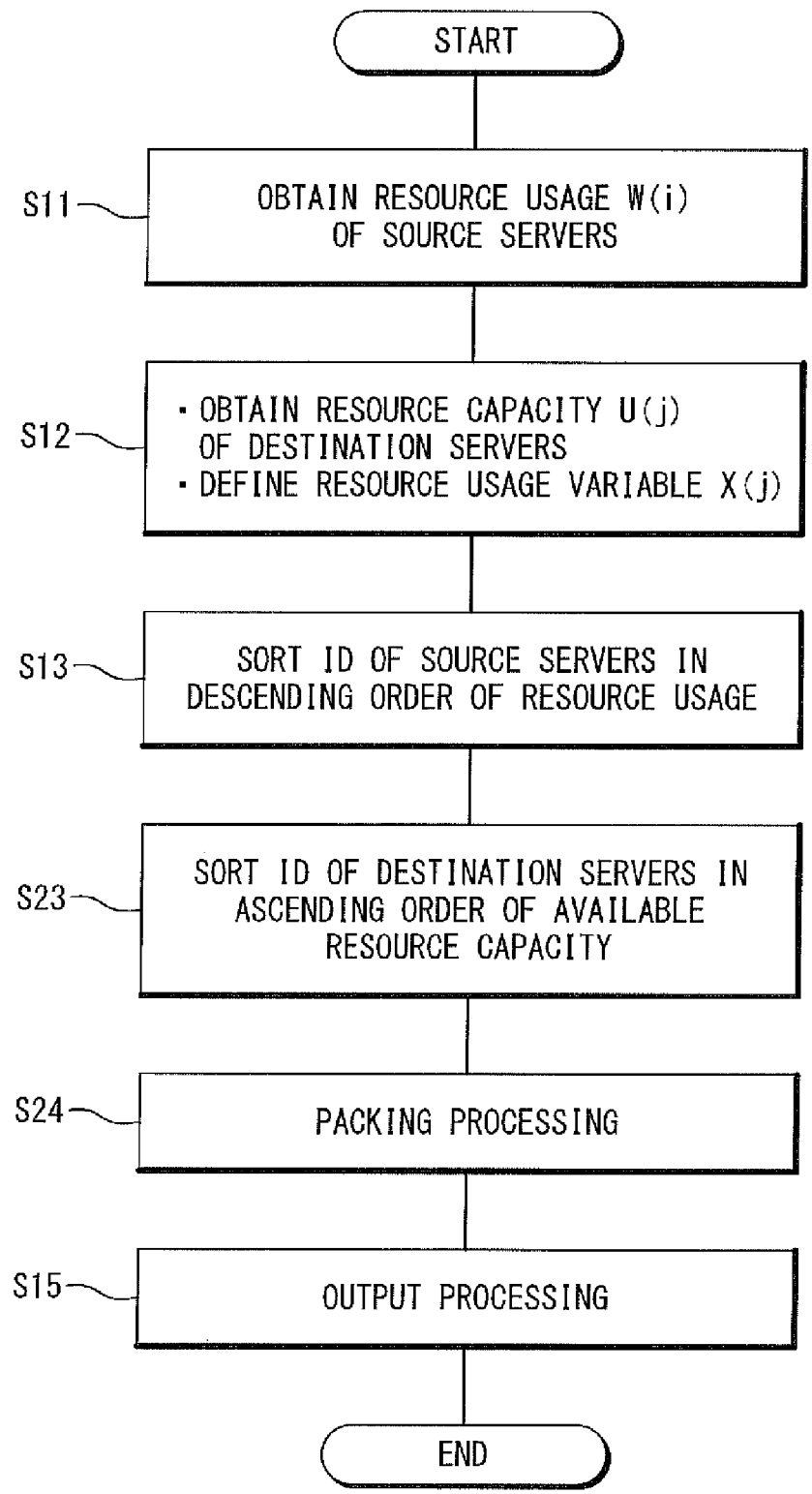
FIG. 12 is a flowchart showing a migration planning method according to the second exemplary embodiment.

FIG. 11 shows a second exemplary embodiment of the migration planning processing. According to the second exemplary embodiment, a destination sort module 23 is newly provided as compared with the first exemplary embodiment. Also, a packing module 24 is provided instead of the packing module 14. FIG. 12 shows a processing flow achieved by these modules. The same reference numerals and the same step numbers are given to the same components and the same processing as those described in the first exemplary embodiment, and an overlapping description will be omitted as appropriate.

Step S23:

The destination sort module 23 receives the resource capacity U(j) and the consumed resource amount X(j) from the resource capacity input module 12. Then, the destination sort module 23 sorts the destination servers j in ascending order of the remaining amount (U(j)−X(j)) of the resource, i.e., the available resource capacity. Since the consumed resource amount X(j) at this time is set to the initial value 0, the remaining amount (available amount) of the resource is equal to the resource capacity U(j). Moreover, the destination sort module 23 stores the sort result in an array T. Each element of the array T is represented by T(l) (l=0 to N−1). In this case, an element T(0) indicates the ID number j of the destination server whose resource capacity U(j) is the minimum, while an element T(N−1) indicates the ID number j of the destination server whose resource capacity U(j) is the maximum. In the present example, T=[1, 0], U(T(0))=U(1)=35, and U(T(1))=U(0)=50.

Figure 13:
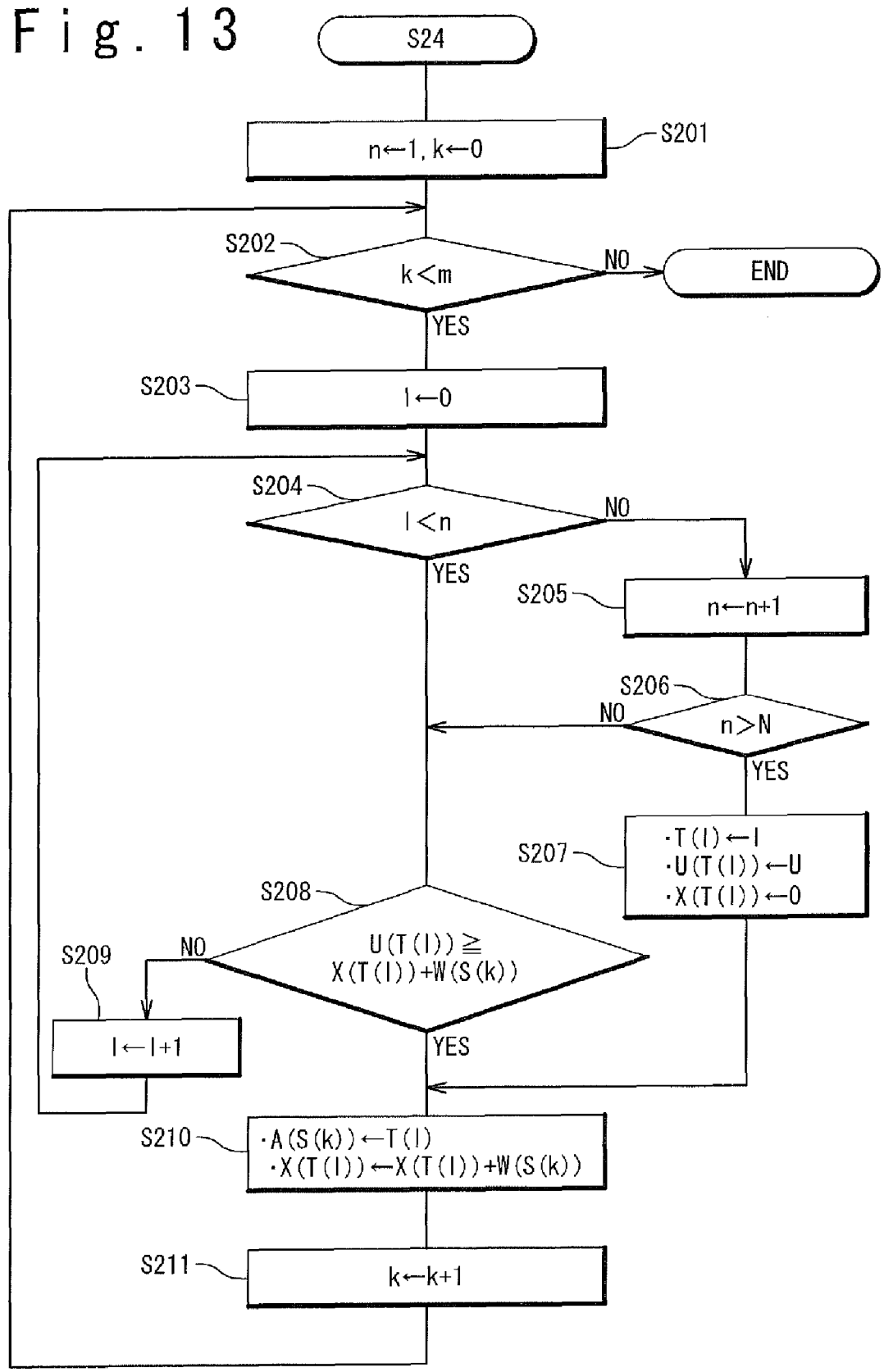
FIG. 13 is a flowchart showing packing processing in the second exemplary embodiment.

Step S24:

The packing module 24 performs the "packing processing" by the use of the resource usage W(i), the array S, the resource capacity U(j), U, the consumed resource amount X(j) and the array T. FIG. 13 is a flowchart showing the packing processing (Step S24) in the second exemplary embodiment, and corresponds to the foregoing FIG. 9. Step S201 to Step S211 shown in FIG. 13 are similar to Step S101 to Step S111 shown in FIG. 9, respectively.

It should be noted here that the parameter 1 indicating the element of the array T is used instead of the parameter j. That is to say, the parameter 1 is increased by one at a time from the initial value 0 in each loop processing, instead of the parameter j being increased by one at a time from the initial value 0. As a result, the object of the comparison changes in the order from the destination server (j=T(0)=1) to the destination server (j=T(1)=0), which is different from the first exemplary embodiment. This means that the destination server j as the object of the comparison is selected from the N destination servers in ascending order of the resource capacity U(j). The other processing is the same as in the first exemplary embodiment.

FIG. 14 corresponds to the foregoing FIG. 10 and shows an example of creating a migration plan in the present exemplary embodiment. As in the case of FIG. 10, a box to which a symbol # is given shows a result of each loop processing. As a result of the packing processing, the allocation relationship "A(0)=0, A(1)=1, A(2)=0, A(3)=1, A(4)=0" is determined, as shown in FIG. 14. The required number n of the destination servers is 2. The resource usage scheduled to be used in the respective destination server are X(0)=50 and X(1)=34.

As compared with the first exemplary embodiment, the required number n is decreased from 3 to 2, which means that the allocation efficiency is improved. This is the effect obtained by selecting the object of the comparison in ascending order of the resource capacity U(j). That is to say, the allocation efficiency is improved when the source server i with the larger resource usage W(i) is allocated to the destination server j with the smaller resource capacity U(j). This corresponds to a procedure in which processing with the heavier load is allocated to a computer with the smaller available capacity, which is opposite to the procedure described in the above-mentioned Japanese Laid Open Patent Application JP-A-Heisei, 10-27167. According to the present exemplary embodiment, the same effects as in first exemplary embodiment can be obtained. Furthermore, it is possible to achieve more efficient server migration. As a result, the operation management costs can be further reduced.

3. Third Exemplary Embodiment

Figure 15:
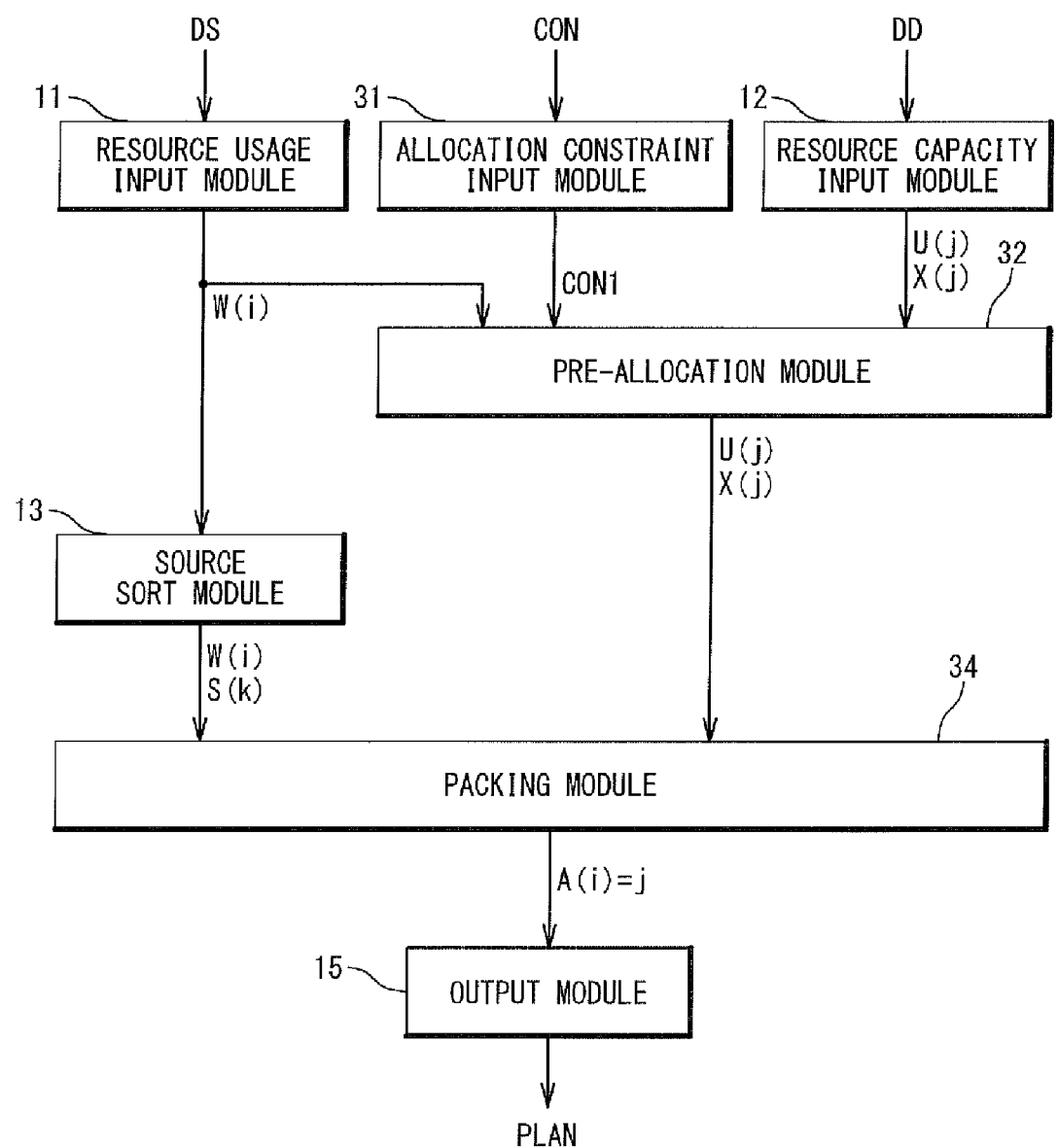
FIG. 15 is a block diagram showing a configuration and processing of the migration planning system according to a third exemplary embodiment.
Figure 16:
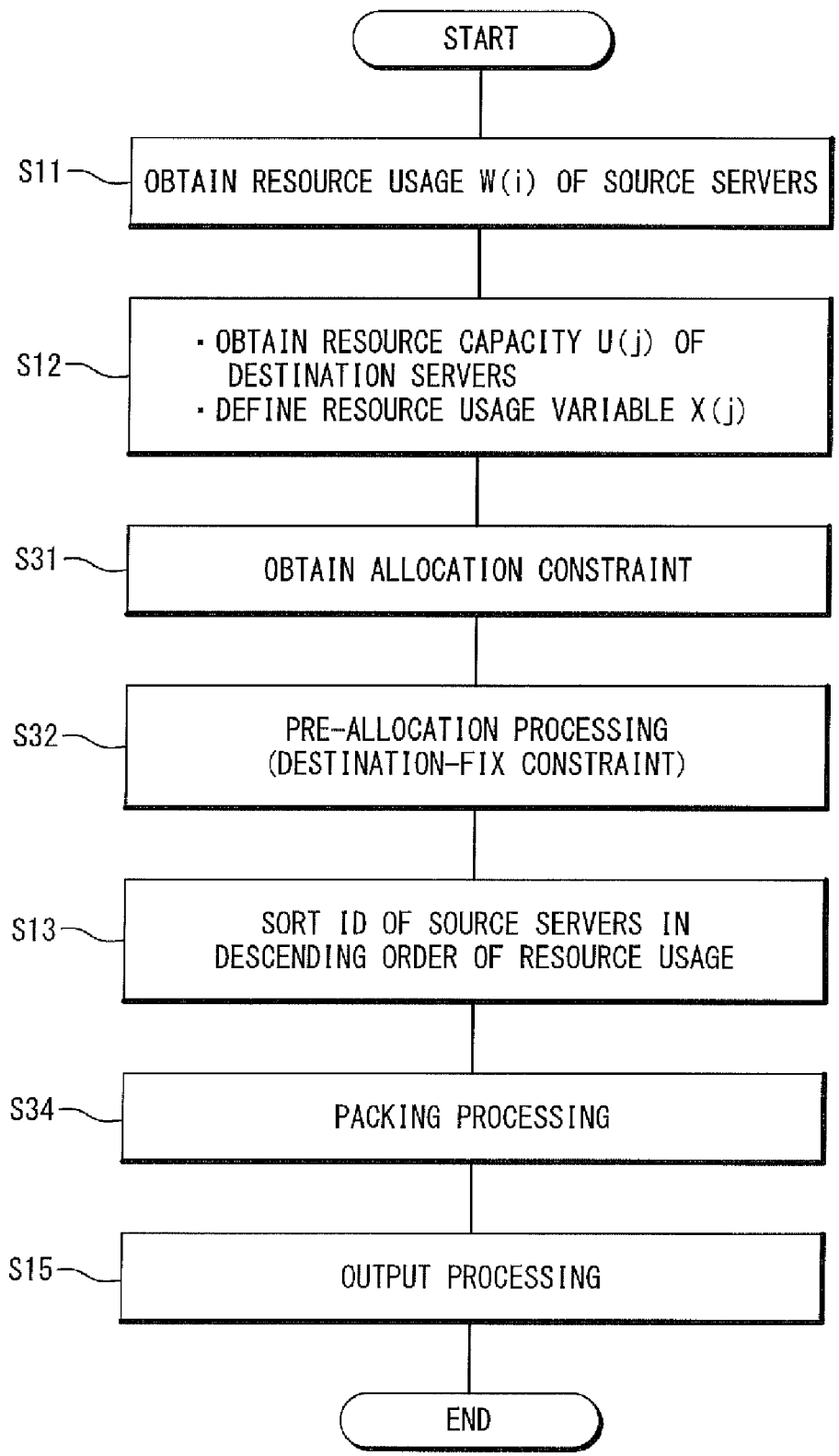
FIG. 16 is a flowchart showing a migration planning method according to the third exemplary embodiment.

FIG. 15 shows a third exemplary embodiment of the migration planning processing. According to the third exemplary embodiment, an allocation constraint input module 31 and a pre-allocation module 32 are newly provided as compared with the first exemplary embodiment. Also, a packing module 34 is provided instead of the packing module 14. FIG. 16 shows a processing flow achieved by these modules. The same reference numerals and the same step numbers are given to the same components and the same processing as those described in the first exemplary embodiment, and an overlapping description will be omitted as appropriate.

Step S31:

The allocation constraint input module 31 reads the allocation constraint data CON from the memory device 3. The allocation constraint data CON indicates the allocation constraint of the allocation relationship (A(i)=j) between the source servers i and the destination servers j. The allocation constraint is the predetermined item in the server migration plan. For example, the allocation constraint specifies an allocation of a certain source server i to a particular destination server j. Such the allocation constraint is hereinafter referred to as "destination-fix constraint CON1". As one example of the destination-fix constraint CON1, let us consider a case where the allocation of the source server (i=4) to the destination server (j=0) is predetermined (A(4)=0).

Step S32:

The pre-allocation module 32 receives the resource usage W(i), the destination-fix constraint CON1, the resource capacity U(j) and the consumed resource amount X(j). In accordance with the destination-fix constraint CON1 (A(4)=0), the pre-allocation module 32 allocates the source server (i=4) to the destination server (j=0). Moreover, the pre-allocation module 32 updates the consumed resource amount X(0) of the destination server (j=0). In other words, the pre-allocation module 32 adds the resource usage (W(4)=14) of the source server (i=4) to the consumed resource amount X(0). This means that the resource usage (W(4)=14) is subtracted from the remaining amount (U(0)−X(0)) of the resource of the destination server (j=0).

Step S34:

After the pre-allocation processing (Step S32), the packing module 34 performs the "packing processing" by the use of the resource usage W(i), the array S, the resource capacity U(j), U, the consumed resource amount X(j) and the allocation relationship A(i). Note that the consumed resource amount X(0) of the destination server (j=0) is already "14" and the allocation relationship A(4)=0 is already determined at the start of the packing processing.

Figure 17:
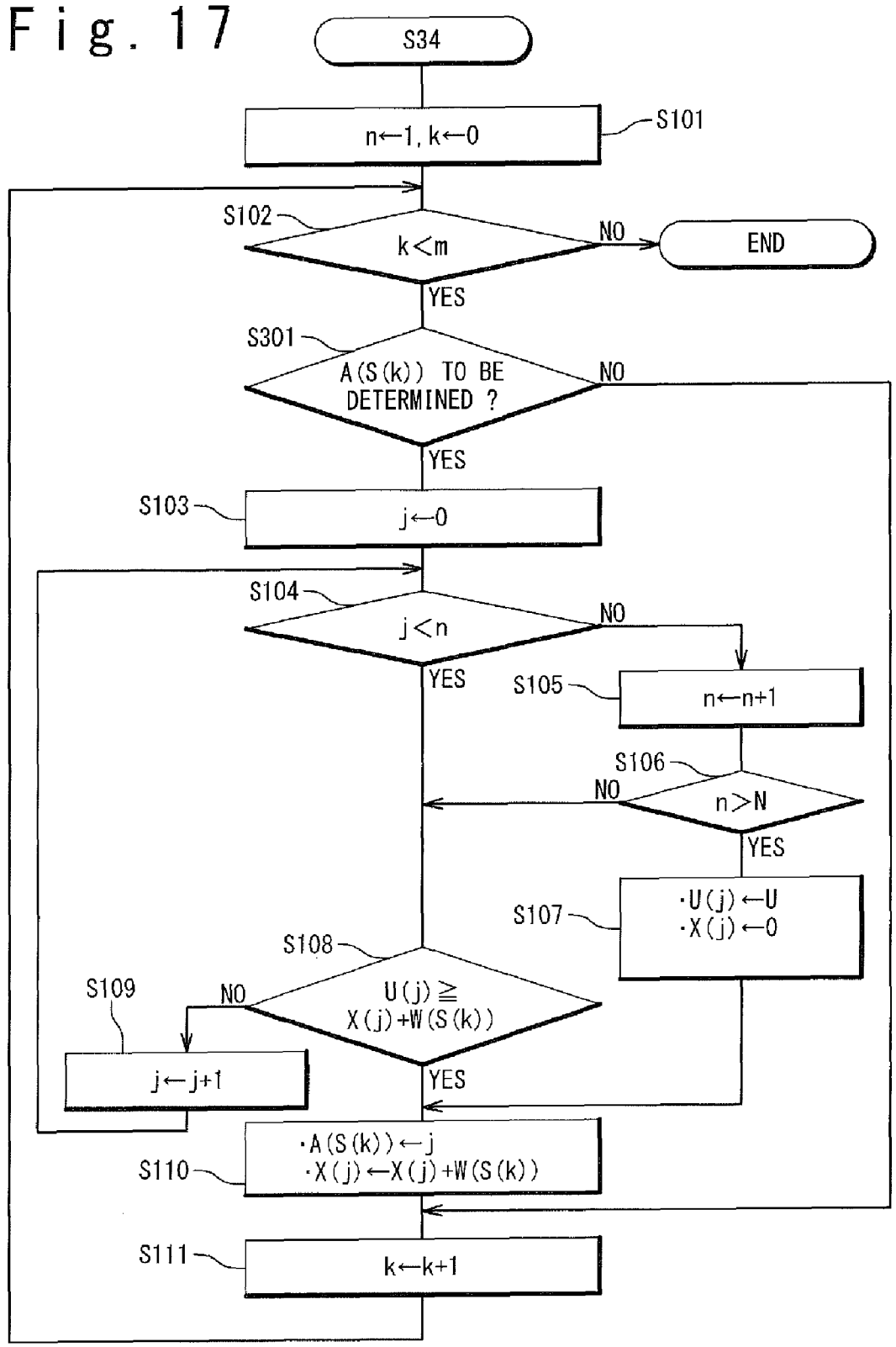
FIG. 17 is a flowchart showing packing processing in the third exemplary embodiment.

FIG. 17 is a flowchart showing the packing processing (Step S34) in the third exemplary embodiment, and corresponds to the foregoing FIG. 9. In the present exemplary embodiment, Step S301 is added ahead of the loop processing, as compared with the first exemplary embodiment. At Step S301, whether the allocation relationship A(S(k)) is already determined or to be determined (not yet determined) is judged. In the case of "to be determined" (Step S301; Yes), the loop processing is executed. On the other hand, in the case of "already determined" (Step S301; No), Step S111 is executed and the next source server S(k) is selected. That is to say, the loop processing and the comparison processing are skipped. The other processing is the same as in the first exemplary embodiment.

FIG. 18 corresponds to the foregoing FIG. 10 and shows an example of creating a migration plan in the present exemplary embodiment. As in the case of FIG. 10, a box to which a symbol # is given shows a result of each loop processing. The allocation relationship A(4)=0 is fixed. As a result of the packing processing, the allocation relationship "A(0)=2, A(1)=0, A(2)=1, A(3)=0, A(4)=0" is determined, as shown in FIG. 18. The required number n of the destination servers is 3. The resource usage scheduled to be used in the respective destination server are X(0)=48, X(1)=19 and X(2)=17.

As described above, the migration planning system 1 according to the present exemplary embodiment is capable of handling the given allocation constraint. The source servers i are allocated to the destination servers j such that the allocation constraint is met. According to the present exemplary embodiment, the same effects as in first exemplary embodiment can be obtained. Furthermore, it is possible to create a suitable migration plan that meets the given allocation constraint.

4. Fourth Exemplary Embodiment

Figure 19:
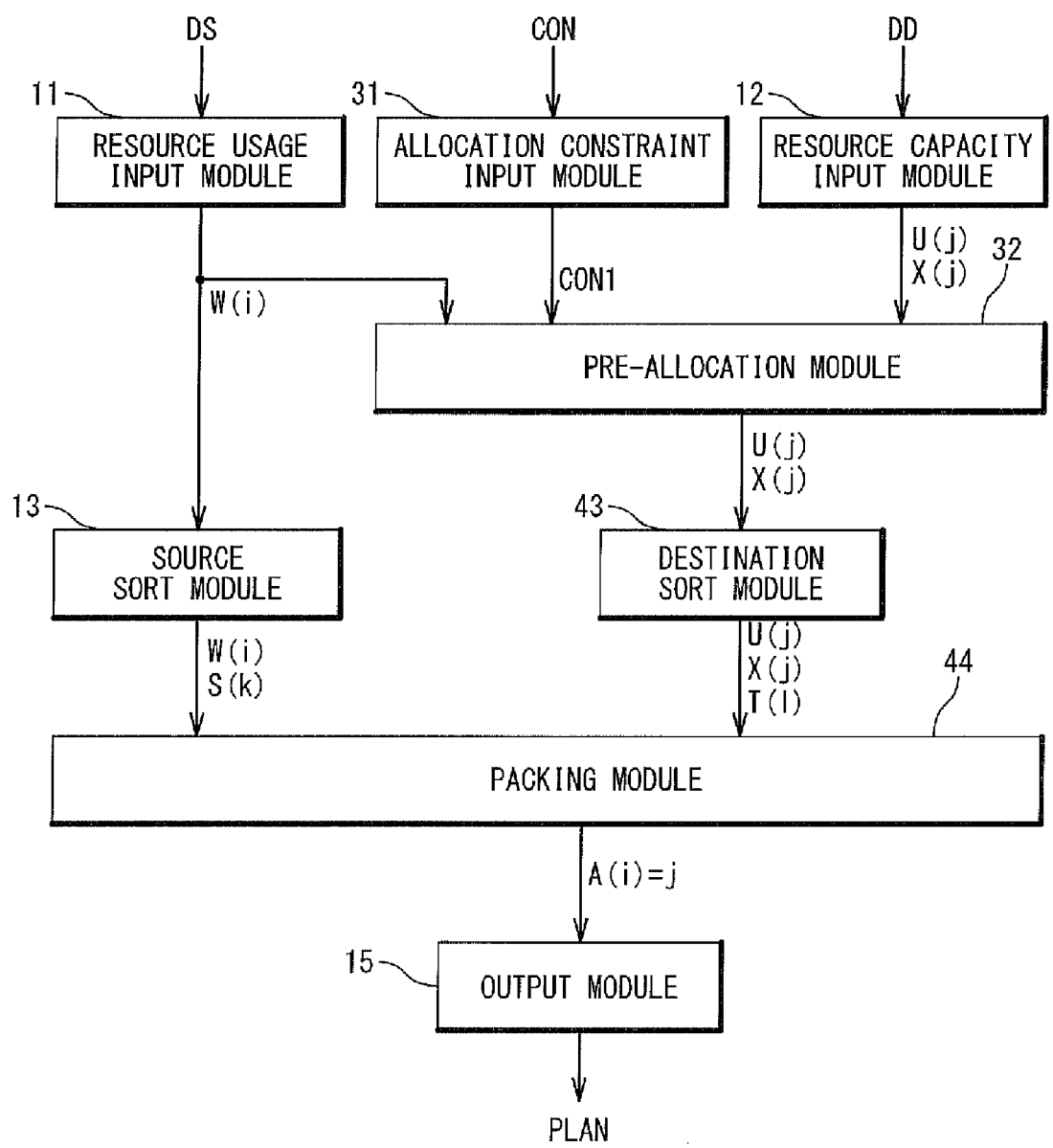
FIG. 19 is a block diagram showing a configuration and processing of the migration planning system according to a fourth exemplary embodiment.
Figure 20:
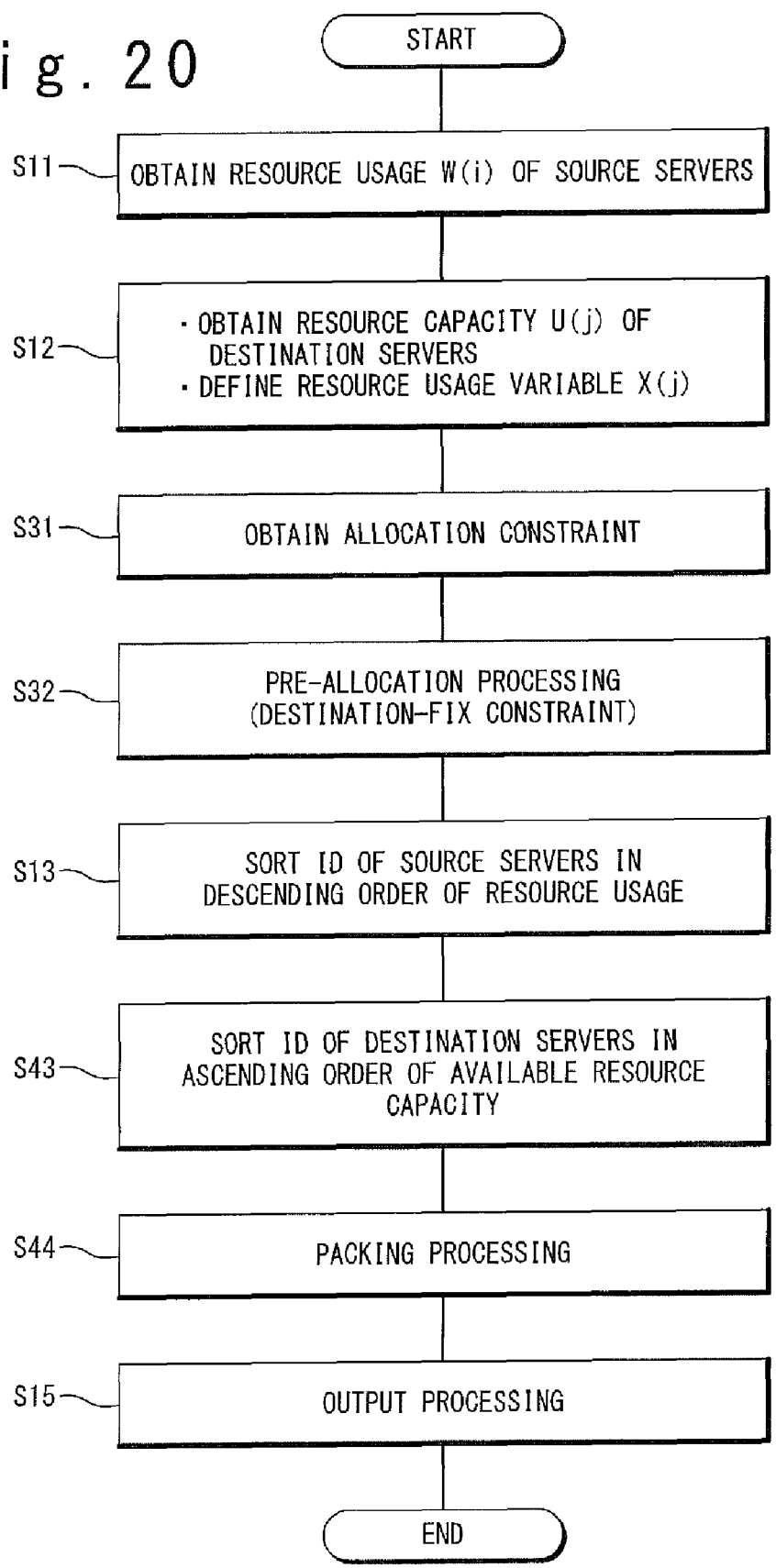
FIG. 20 is a flowchart showing a migration planning method according to the fourth exemplary embodiment.

A fourth exemplary embodiment corresponds to a combination of the foregoing second exemplary embodiment and third exemplary embodiment. FIG. 19 shows the fourth exemplary embodiment of the migration planning processing. According to the fourth exemplary embodiment, a destination sort module 43 is newly provided as compared with the third exemplary embodiment. Also, a packing module 44 is provided instead of the packing module 34. FIG. 20 shows a processing flow achieved by these modules. The same reference numerals and the same step numbers are given to the same components and the same processing as those described in the foregoing exemplary embodiments, and an overlapping description will be omitted as appropriate.

Step S43:

The destination sort module 43 receives the resource capacity U(j) and the consumed resource amount X(j) from the pre-allocation module 32. When the destination-fix constraint CON1 specifies "A(4)=0", the consumed resource amount X(0) is already "14" as a result of the pre-allocation processing (Step S32). The destination sort module 43 sorts the destination servers j in ascending order of the remaining amount (U(j)–X(j)) of the resource. Moreover, the destination sort module 43 stores the sort result in the array T. In the present example, the remaining amount of the destination server (j=0) is "36" and the remaining amount of the destination server (j=1) is "35". Therefore, the array T=[1, 0] is obtained.

Step S44:

The packing module 44 performs the "packing processing" by the use of the resource usage W(i), the array S, the resource capacity U(j), U, the consumed resource amount X(j), the array T and the allocation relationship A(i).

Figure 21:
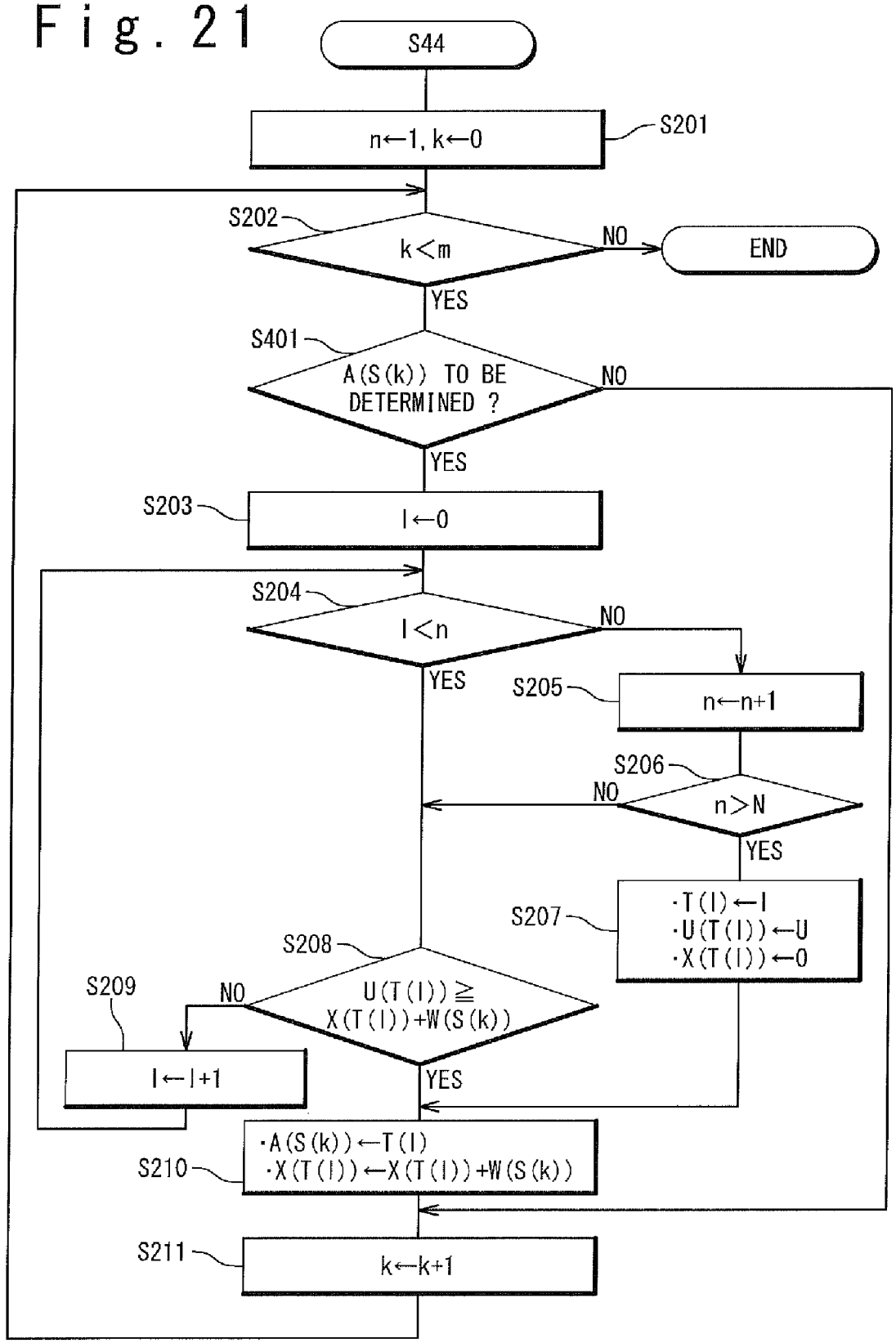
FIG. 21 is a flowchart showing packing processing in the fourth exemplary embodiment.

FIG. 21 is a flowchart showing the packing processing (Step S44) in the fourth exemplary embodiment, and corresponds to the foregoing FIG. 13. In the present exemplary embodiment, Step S401 is added ahead of the loop processing, as compared with the second exemplary embodiment. At Step S401, whether the allocation relationship A(S(k)) is already determined or to be determined (not yet determined) is judged. In the case of "to be determined" (Step S401; Yes), the loop processing is executed. On the other hand, in the case of "already determined" (Step S401; No), Step S211 is executed and the next source server S(k) is selected. That is to say, the loop processing and the comparison processing are skipped. The other processing is the same as in the second exemplary embodiment.

FIG. 22 corresponds to the foregoing FIG. 18 and shows an example of creating a migration plan in the present exemplary embodiment. A box to which a symbol # is given shows a result of each loop processing. As a result of the packing processing, the allocation relationship "A(0)=0, A(1)=1, A(2)=0, A(3)=1, A(4)=0" is determined, as shown in FIG. 22. The required number n of the destination servers is 2. The resource usage scheduled to be used in the respective destination server are X(0)=50 and X(1)=34.

As compared with the third exemplary embodiment, the required number n is decreased from 3 to 2, which means that the allocation efficiency is improved. This is the effect obtained by using the array T and selecting the object of the comparison in ascending order of the resource capacity U(j). According to the present exemplary embodiment, the same effects as in third exemplary embodiment can be obtained. Furthermore, it is possible to achieve more efficient server migration. As a result, the operation management costs can be further reduced.

5. Fifth Exemplary Embodiment

In a fifth exemplary embodiment, another allocation constraint different from the destination-fix constraint CON1 will be explained. For example, an allocation constraint that a certain source server (i=g) and another source server (i=h) are allocated to the same destination server is considered (A(g)=A(h)). Such the allocation constraint is hereinafter referred to as "destination-equality constraint CON2". For example, the destination-equality constraint CON2 specifies the allocations of the source server (i=0) and the source server (i=1) to the same destination server (A(0)=A(1)).

Figure 23:
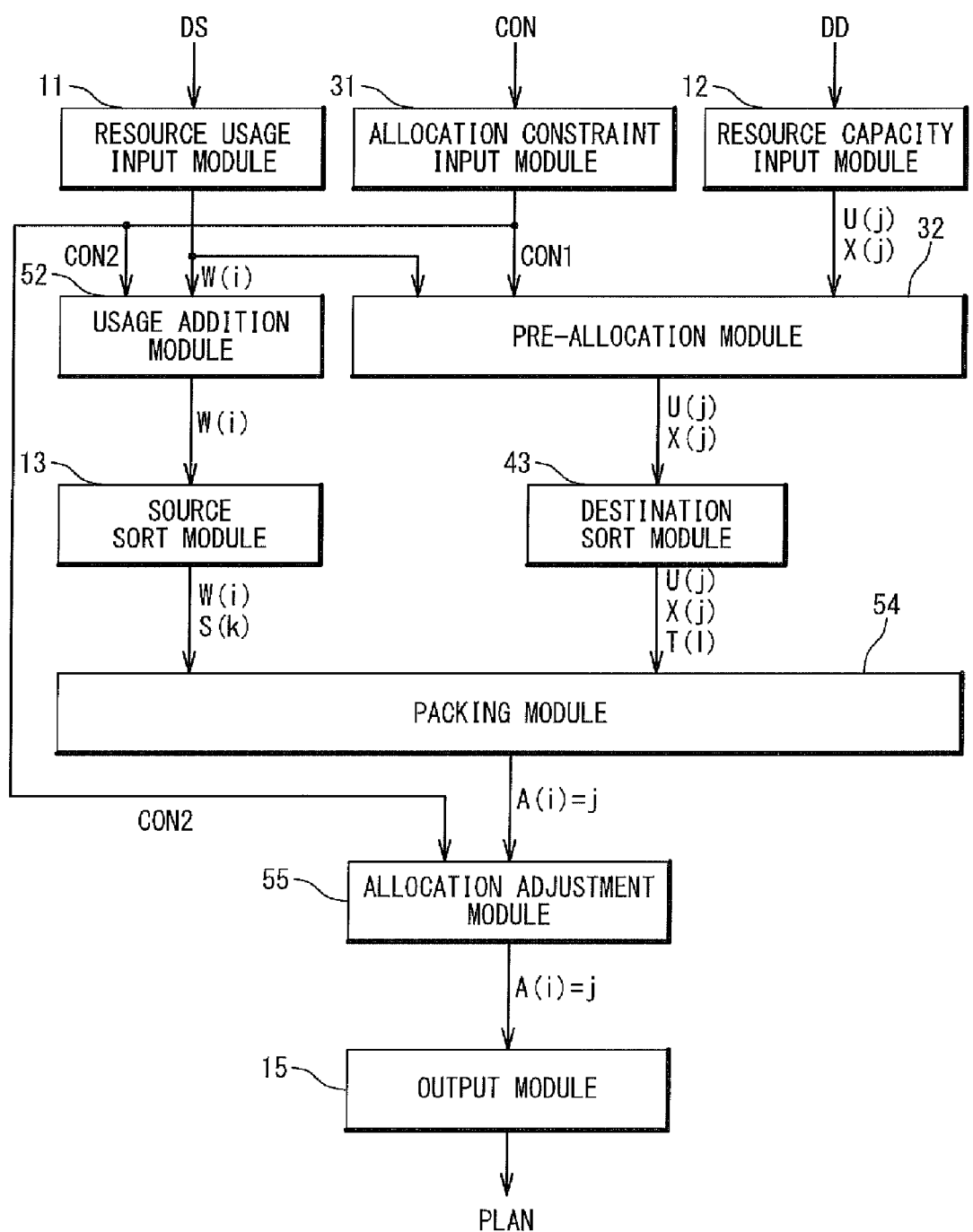
FIG. 23 is a block diagram showing a configuration and processing of the migration planning system according to a fifth exemplary embodiment.
Figure 24:
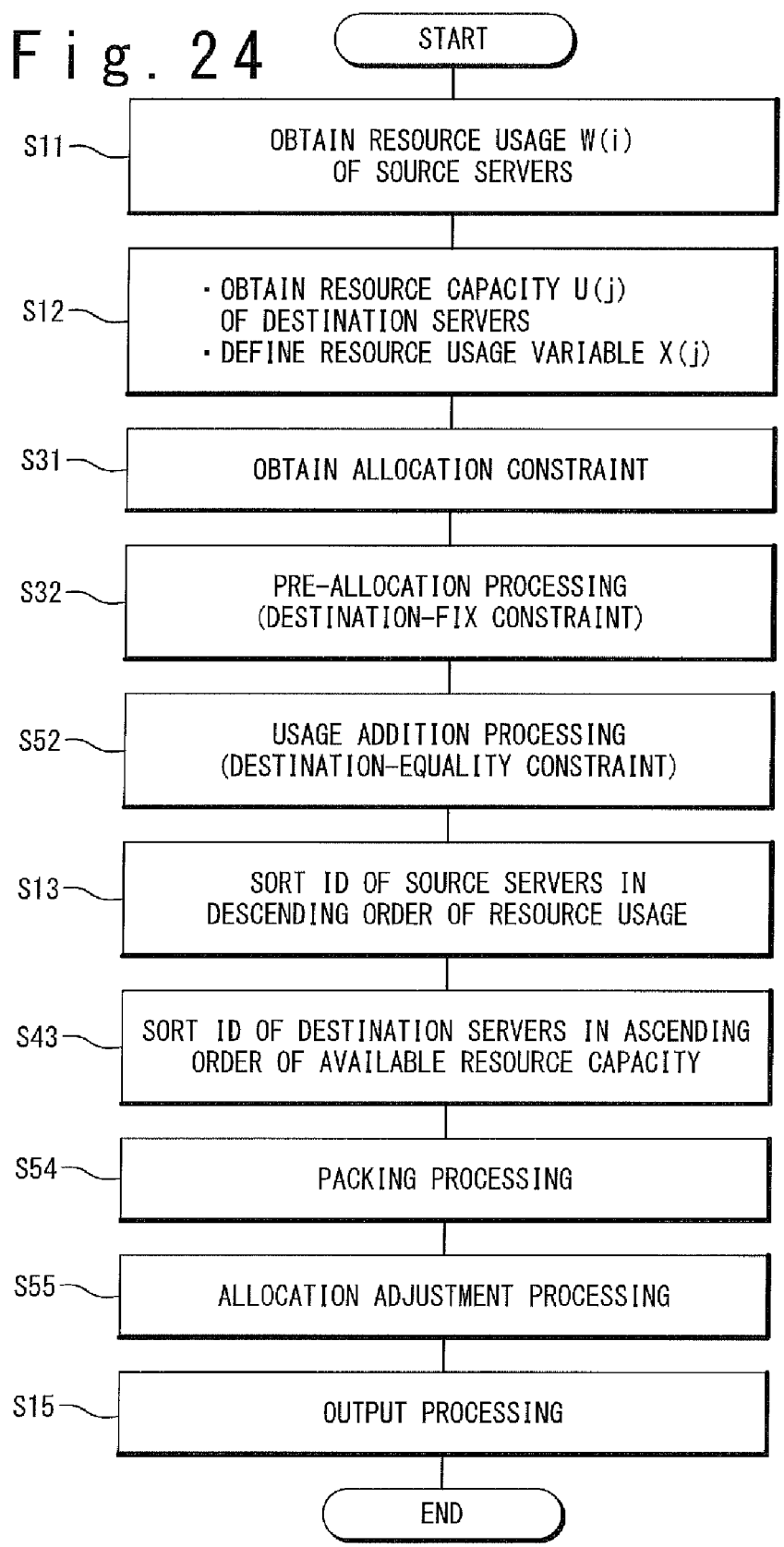
FIG. 24 is a flowchart showing a migration planning method according to the fifth exemplary embodiment.

FIG. 23 shows the fifth exemplary embodiment of the migration planning processing. According to the fifth exemplary embodiment, a usage addition module 52 and an allocation adjustment module 55 are newly provided as compared with the fourth exemplary embodiment. Also, a packing module 54 is provided instead of the packing module 44. FIG. 24 shows a processing flow achieved by these modules. The same reference numerals and the same step numbers are given to the same components and the same processing as those described in the fourth exemplary embodiment, and an overlapping description will be omitted as appropriate.

Step S31:

Let us consider a case where the allocation constraint data CON indicates the destination-equality constraint CON2 (A(0)=A(1)) in addition to the above-mentioned destination-fix constraint CON1 (A(4)=0).

Step S52:

The usage addition module 52 receives the resource usage W(i) from the resource usage input module 11 and receives the destination-equality constraint CON2 from the allocation constraint input module 31. In accordance with the destination-equality constraint CON2, the usage addition module 52 changes the resource usage W(i). More specifically, the usage addition module 52 sums up all the resource usage W(i) of the source servers specified by the destination-equality constraint CON2. In other words, the usage addition module 52 temporarily bundle together the source servers specified by the destination-equality constraint CON2. In the present example, the usage addition module 52 sets the resource usage W(0) of the source server (i=0) to "W(0)+W(1)=40", and sets the resource usage W(1) of the source server (i=1) to "0".

Step S13:

The source sort module 13 receives the post-change resource usage W(i) from the usage addition module 52, and sorts the source servers i in descending order of the received resource usage W(i). In the present example, the resource usage W(0)=40 is the maximum and the resource usage W(1)=0 is the minimum. Therefore, the array S=[0, 2, 4, 3, 1] is obtained.

Step S54:

The packing module 54 performs the "packing processing" by the use of the resource usage W(i), the array S, the resource capacity U(j), U, the consumed resource amount X(j), the array T and the allocation relationship A(i). The processing flow is the same as in the fourth exemplary embodiment (refer to FIG. 21; Step S44).

FIG. 25 corresponds to the foregoing FIG. 22 and shows an example of creating a migration plan in the present exemplary embodiment. A box to which a symbol # is given shows a result of each loop processing. As a result of the packing processing, the allocation relationship "A(0)=2, A(1)=1, A(2)=1, A(3)=1, A(4)=0" is once determined, as shown in FIG. 25. The required number n of the destination servers is 3. The resource usage scheduled to be used in the respective destination server are X(0)=14, X(1)=30 and X(2)=40.

Step S55:

Since the destination-equality constraint CON2 is not considered during the packing processing, the allocation relationship A(i) obtained as the result of the packing processing does not always satisfy the destination-equality constraint CON2. In fact, A(1) is not equal to A(0) in the example shown in FIG. 25. In this case, the allocation adjustment module 55 adjusts the allocation relationship A(i).

As shown in FIG. 23, the allocation adjustment module 55 receives the allocation relationship A(i) and the destination-equality constraint CON2. Then, the allocation adjustment module 55 adjusts the destinations of the source servers specified by the destination-equality constraint CON2 to the same destination server. In the present example, in accordance with the destination-equality constraint CON2 (A(0)=A(1)), the allocation adjustment module 55 modifies "A(1)=1" to be "A(1)=2=A(0)" (refer to FIG. 25). As a result, the destination-equality constraint CON2 is satisfied. Note that since the resource usage W(1) of the source server (i=1) is integrated into the source server (i=0) at the beginning, there is no need to update the consumed resource amount X(j) with the allocation adjustment.

As described above, according to the present exemplary embodiment, the source servers i are allocated to the destination servers j such that the allocation constraint is met. That is to say, it is possible to create a suitable migration plan that meets the given allocation constraint.

Also, the destination sort module 43 may not be used in the present exemplary embodiment. In that case, Step S43 is omitted, and the packing processing (Step S54) becomes the same as in the third exemplary embodiment (refer to FIG. 17; Step S34). Also, the destination-fix constraint CON1 may not be specified. In that case, the pre-allocation module 32 is not used, and Step S32 is omitted. The packing processing (Step S54) becomes the same as in the first exemplary embodiment (refer to FIG. 9; Step S14) or the second exemplary embodiment (refer to FIG. 13; Step S24).

6. Sixth Exemplary Embodiment

In a sixth exemplary embodiment, still another allocation constraint will be explained. The allocation constraint treated in the sixth exemplary embodiment is a negative-type allocation constraint. For example, the negative-type allocation constraint prohibits an allocation of a certain source server i to a particular destination server j (A(i)≠j). Such the allocation constraint is hereinafter referred to as "destination-negation constraint CON3". Alternatively, the negative-type allocation constraint prohibits allocations of a certain source server (i=g) and another source server (i=h) to the same destination server (A(g)≠A(h)). Such the allocation constraint is hereinafter referred to as "destination-inequality constraint CON3". The negative-type allocation constraint CON3 mentioned above cannot be treated prior to the packing processing and needs to be considered during the packing processing.

Figure 26:
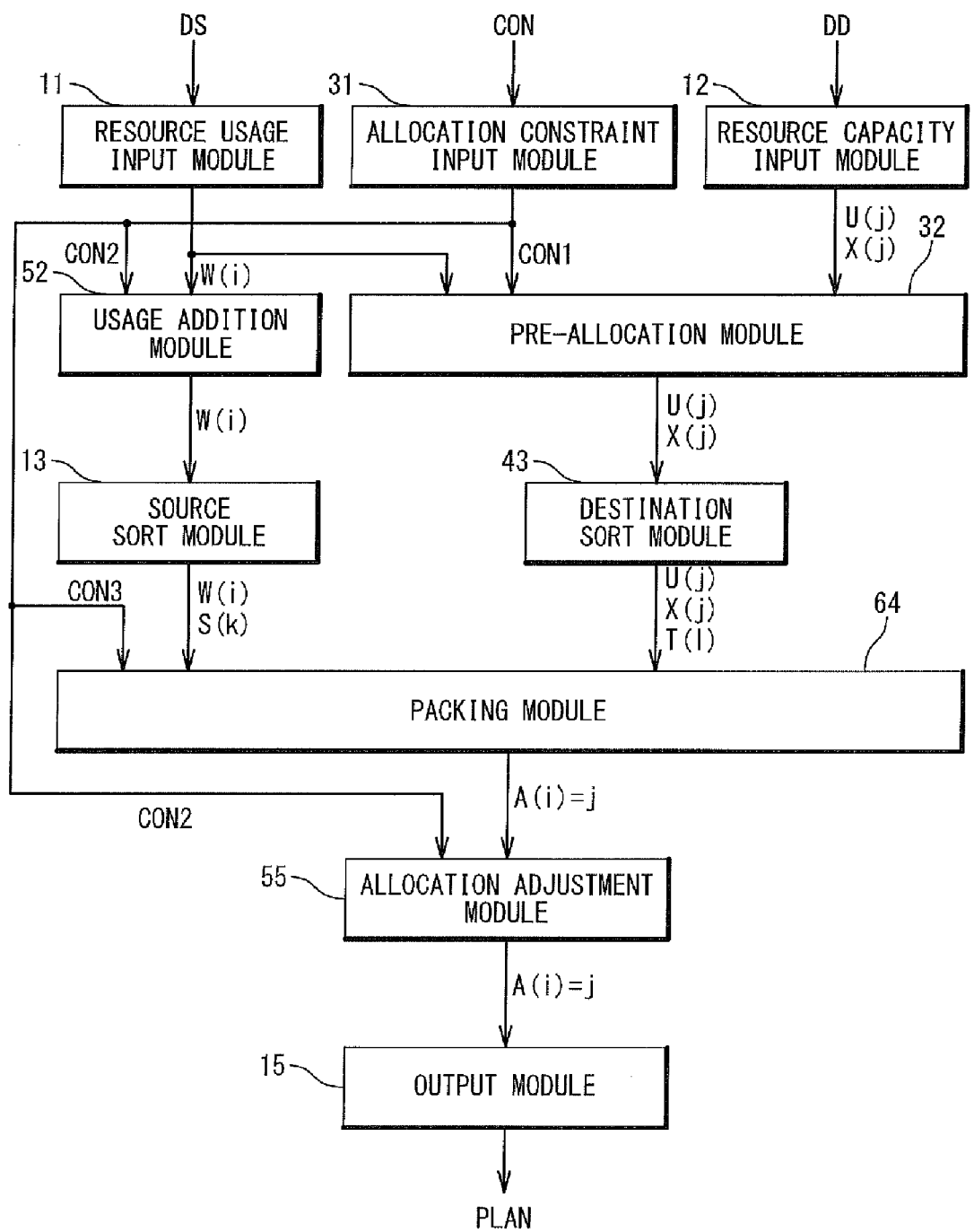
FIG. 26 is a block diagram showing a configuration and processing of the migration planning system according to a sixth exemplary embodiment.

FIG. 26 shows the sixth exemplary embodiment of the migration planning processing. According to the present exemplary embodiment, a packing module 64 is provided instead of the packing module in the foregoing exemplary embodiments. The packing module 64 performs the packing processing with reference to the destination-negation constraint CON3 and/or the destination-inequality constraint CON3. The processing other than the packing processing is the same as in the foregoing exemplary embodiments, and the overlapping description will be omitted as appropriate. For example, Step S54 in FIG. 24 is replaced by the packing processing (Step S64) executed by the packing module 64 according to the present exemplary embodiment.

Figure 27:
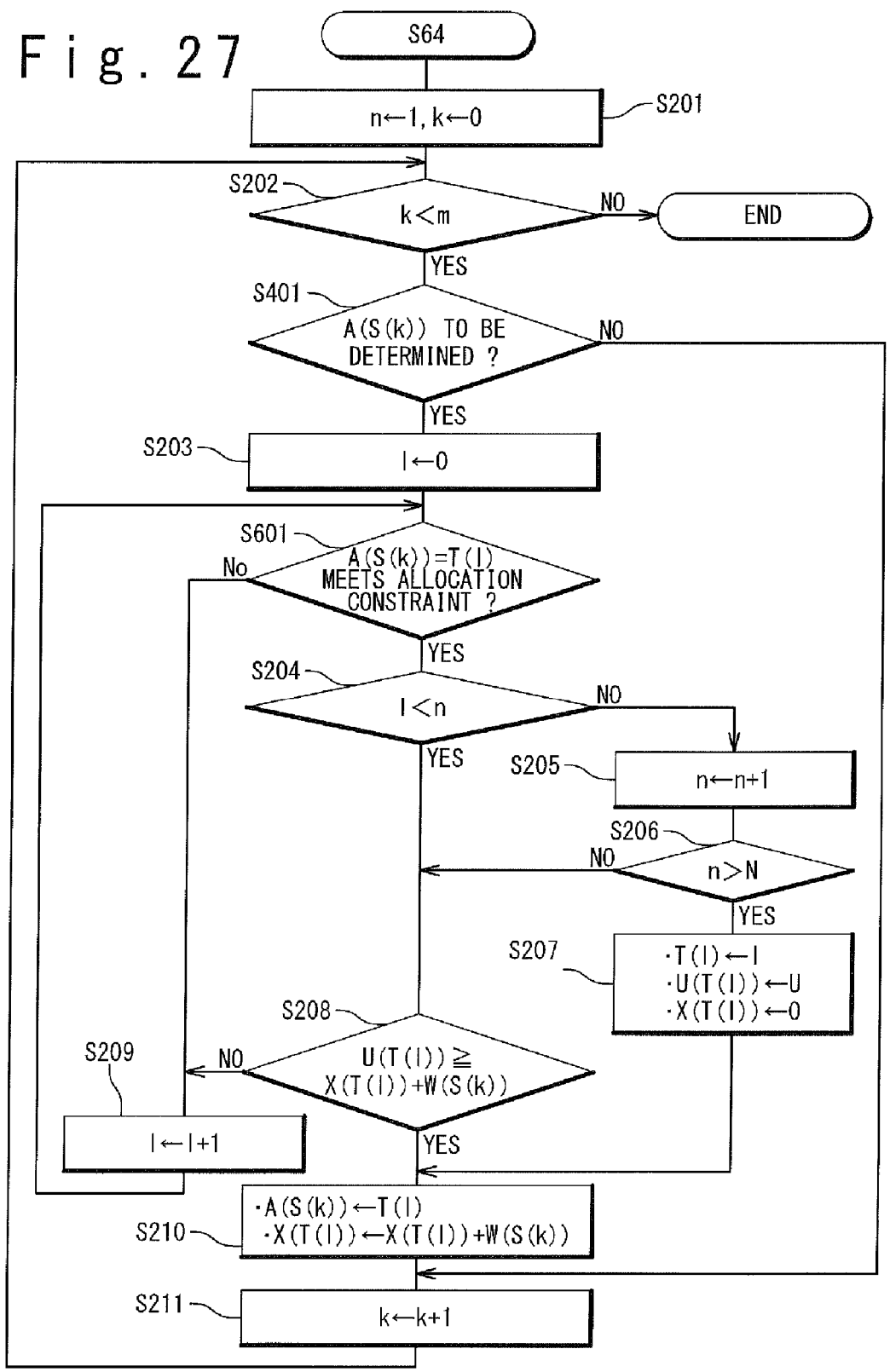
FIG. 27 is a flowchart showing packing processing in the sixth exemplary embodiment.

FIG. 27 is a flowchart showing the packing processing (Step S64) in the present exemplary embodiment. In the present exemplary embodiment, Step S601 is added to the loop processing. At Step S601, it is judged whether or not the allocation relationship A(S(k))=T(1) obtained from the selected parameters k and l (namely, i and j) meets the allocation constraint CON3. In a case of "matching" (Step S601; Yes), the same processing as in the foregoing exemplary embodiments is executed. On the other hand, in a case of "mismatching" (Step S601; No), the comparison (Step S208) is skipped and the next destination server j is selected (Step S209). In other words, if the selected source server i and the selected destination server j violate the allocation constraint CON3, another destination server j is newly selected. The other processing is the same as in the foregoing exemplary embodiments.

FIG. 28 shows an example of creating a migration plan in the present exemplary embodiment. In the example, the destination-negation constraint A(1)≠1 and the destination-inequality constraint A(2)≠A(3) in addition to the destination-fix constraint A(4)=0 are given as the allocation constraint. A box to which a symbol # is given shows a result of each loop processing. As a result of the packing processing, the allocation relationship "A(0)=2, A(1)=0, A(2)=1, A(3)=0, A(4)=0" is determined, as shown in FIG. 28. The required number n of the destination servers is 3. The resource usage scheduled to be used in the respective destination server are X(0)=48, X(1)=19 and X(2)=17.

As described above, according to the present exemplary embodiment, the source servers i are allocated to the destination servers j such that the negative-type allocation constraint is met. That is to say, it is possible to create a suitable migration plan that meets the given allocation constraint.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A server migration planning system for planning server migration from m source servers to at least N destination servers in which m is an integer not less than 2 and N is an integer not less than 1, comprising:

a memory device in which a first data indicating resource usage of said respective source servers and a second data indicating resource capacity of said respective destination servers are stored; and a processor configured to allocate said respective source servers to any ones of said destination servers based on said first data and said second data, wherein in packing processing, said processor selects said source servers one-by-one in descending order of said resource usage, selects any one of said destination servers, and makes a comparison between a comparison-object usage, which is said resource usage of said selected source server, and a remaining amount of said resource capacity of said selected destination server, wherein in a case where said comparison-object usage is more than said remaining amount, said processor selects another destination server different from said selected destination server and then carries out said comparison again, while in a case where said comparison-object usage is not more than said remaining amount, said processor allocates said selected source server to said selected destination server.

2. The server migration planning system according to claim 1, wherein said processor selects an object of said comparison from said N destination servers in ascending order of said resource capacity.

3. The server migration planning system according to claim 1, wherein in a case where said comparison-object usage is more than said remaining amount of every one of said N destination servers, said processor allocates said selected source server to an additional destination server different from said N destination servers.

4. The server migration planning system according to claim 1, wherein said N destination servers are different in said resource capacity from each other.

5. The server migration planning system according to claim 1, wherein a third data indicating a constraint of an allocation relationship between said source servers and said destination servers is further stored in said memory device, wherein said processor allocates said respective source servers to any ones of said destination servers so as to meet said constraint, based on said third data in addition to said first data and said second data.

6. The server migration planning system according to claim 5, wherein said m source servers include a first source server and said N destination servers include a first destination server, wherein said constraint specifies an allocation of said first source server to said first destination server.

7. The server migration planning system according to claim 6, wherein said processor allocates said first source server to said first destination server, subtracts said resource usage of said first source server from said remaining amount of said first destination server, and then initiates said packing processing, wherein in said packing processing, said processor skips said comparison with regard to said first source server.

8. The server migration planning system according to claim 5, wherein said m source servers include a first source server and a second source server, wherein said constraint specifies allocations of said first source server and said second source server to a same destination server.

9. The server migration planning system according to claim 8, wherein said resource usage of said first source server indicated by said first data is first resource usage and said resource usage of said second source server indicated by said first data is second resource usage, wherein said processor sets said resource usage of said first source server to sum of said first resource usage and said second resource usage, sets said resource usage of said second source server to zero, and then initiates said packing processing, wherein after said packing processing, said processor adjusts destinations of said first source server and said second source server to said same destination server.

10. The server migration planning system according to claim 5, wherein said m source servers include a first source server and said N destination servers include a first destination server, wherein said constraint prohibits an allocation of said first source server to said first destination server.

11. The server migration planning system according to claim 5, wherein said m source servers include a first source server and a second source server, wherein said constraint prohibits allocations of said first source server and said second source server to a same destination server.

12. The server migration planning system according to claim 10, wherein in said packing processing, if said selected source server and said selected destination server violate said constraint, said processor skips said comparison and selects another destination server different from said selected destination server.

13. A server migration planning method for planning server migration from m source servers to at least N destination servers in which m is an integer not less than 2 and N is an integer not less than 1, comprising:

(A) reading a first data indicating resource usage of said respective source servers from a memory device;

(B) reading a second data indicating resource capacity of said respective destination servers from a memory device; and (C) allocating said respective source servers to any ones of said destination servers based on said first data and said second data, wherein said (C) allocating includes:

(C1) selecting said source servers one-by-one in descending order of said resource usage and selecting any one of said destination servers;

(C2) making a comparison between a comparison-object usage, which is said resource usage of said selected source server, and a remaining amount of said resource capacity of said selected destination server;

(C3) carrying out said comparison again after selecting another destination server different from said selected destination server, in a case where said comparison-object usage is more than said remaining amount; and (C4) allocating said selected source server to said selected destination server, in a case where said comparison-object usage is not more than said remaining amount.

14. The server migration planning method according to claim 13, wherein said (C) allocating further includes:

(C5) allocating said selected source server to an additional destination server different from said N destination servers, in a case where said comparison-object usage is more than said remaining amount of every one of said N destination servers.

15. The server migration planning method according to claim 13, wherein in said (C) allocating, an object of said comparison among said N destination servers is selected in ascending order of said resource capacity.

16. The server migration planning method according to claim 13, wherein said N destination servers are different in said resource capacity from each other.

17. The server migration planning method according to claim 13, further comprising: (D) reading a third data indicating a constraint of an allocation relationship between said source servers and said destination servers from a memory device, wherein in said (C) allocating, said respective source servers are allocated to any ones of said destination servers such that said constraint is met.

18. A server migration planning program recorded on a computer-readable medium that, when executed, causes a computer to perform a method of planning server migration from m source servers to at least N destination servers in which m is an integer not less than 2 and N is an integer not less than 1, said method comprising:

(A) reading a first data indicating resource usage of said respective source servers from a memory device;

(B) reading a second data indicating resource capacity of said respective destination servers from a memory device; and (C) allocating said respective source servers to any ones of said destination servers based on said first data and said second data, wherein said (C) allocating includes:

(C1) selecting said source servers one-by-one in descending order of said resource usage and selecting any one of said destination servers;

(C2) making a comparison between a comparison-object usage, which is said resource usage of said selected source server, and a remaining amount of said resource capacity of said selected destination server;

(C3) carrying out said comparison again after selecting another destination server different from said selected destination server, in a case where said comparison-object usage is more than said remaining amount; and (C4) allocating said selected source server to said selected destination server, in a case where said comparison-object usage is not more than said remaining amount.

19. The server migration planning program according to claim 18, wherein said (C) allocating further includes:

(C5) allocating said selected source server to an additional destination server different from said N destination servers, in a case where said comparison-object usage is more than said remaining amount of every one of said N destination servers.

20. The server migration planning program according to claim 18, wherein in said (C) allocating, an object of said comparison among said N destination servers is selected in ascending order of said resource capacity.

* * * * *